US006901399B1

(12) United States Patent  
Corston et al.

(10) Patent No.: US 6,901,399 B1
(45) Date of Patent: May 31, 2005

(54) SYSTEM FOR PROCESSING TEXTUAL INPUTS USING NATURAL LANGUAGE PROCESSING TECHNIQUES

(75) Inventors: Simon H. Corston, Seattle, WA (US); William B. Dolan, Redmond, WA (US); Lucy H. Vanderwende, Bellevue, WA (US); Lisa Braden-Harder, Reston, VA (US)

(73) Assignee: Microsoft Corporation, Redmond, WA (US)

( * ) Notice: Subject to any disclaimer, the term of this patent is extended or adjusted under 35 U.S.C. 154(b) by 1057 days.

(21) Appl. No.: 09/097,979

(22) Filed: Jun. 16, 1998

Related U.S. Application Data

(63) Continuation-in-part of application No. 08/898,652, filed on Jul. 22, 1997, now Pat. No. 5,933,822.

(51) Int. Cl.$^7$ .............................................. G06F 17/30
(52) U.S. Cl. ................. 707/6; 707/2; 707/3; 707/5; 707/10; 704/9
(58) Field of Search ............................. 707/2, 3, 5, 6, 707/10; 395/708; 704/9

(56) References Cited

U.S. PATENT DOCUMENTS 5,265,065 A  * 11/1993 Turtle ............................ 707/4
5,642,502 A    6/1997 Driscoll ...................... 395/605
5,794,050 A  *  8/1998 Dahlgren et al. ........... 395/708
5,809,496 A  *  9/1998 Byrd, Jr. et al. ................ 707/5
5,813,002 A  *  9/1998 Agrawal et al. ............... 707/5
5,864,846 A  *  1/1999 Voorhees et al. .............. 707/5
5,870,740 A  *  2/1999 Rose et al. ..................... 707/5
5,907,840 A  *  5/1999 Evans ........................... 707/5
5,966,686 A  * 10/1999 Heidorn et al. ................ 704/9
5,983,216 A  * 11/1999 Kirsch et al. .................. 707/2
5,987,446 A  * 11/1999 Corey et al. ................... 707/3
5,987,457 A  * 11/1999 Ballard .......................... 707/5
5,995,922 A  * 11/1999 Penteroudakis et al. ....... 704/9
6,006,221 A  * 12/1999 Liddy et al. .................... 707/5
6,076,051 A  *  6/2000 Messerly et al. ............... 704/9

* cited by examiner

Primary Examiner—Thuy N. Pardo
(74) Attorney, Agent, or Firm—Joseph R. Kelly; Westman, Champlin & Kelly, P.A.

(57) ABSTRACT

A system filters documents in a document set retrieved from a document store in response to a query. The system obtains a first set of logical forms based on a selected one of the query and the documents in the document set. The system obtains a second set of logical forms based on another of the query and the documents in the document set. The system then uses natural language processing techniques to modify the first logical forms to obtain a modified set of logical forms. The system filters documents in the document set based on a predetermined relationship between the modified set of logical forms and the second set of logical forms.

76 Claims, 26 Drawing Sheets

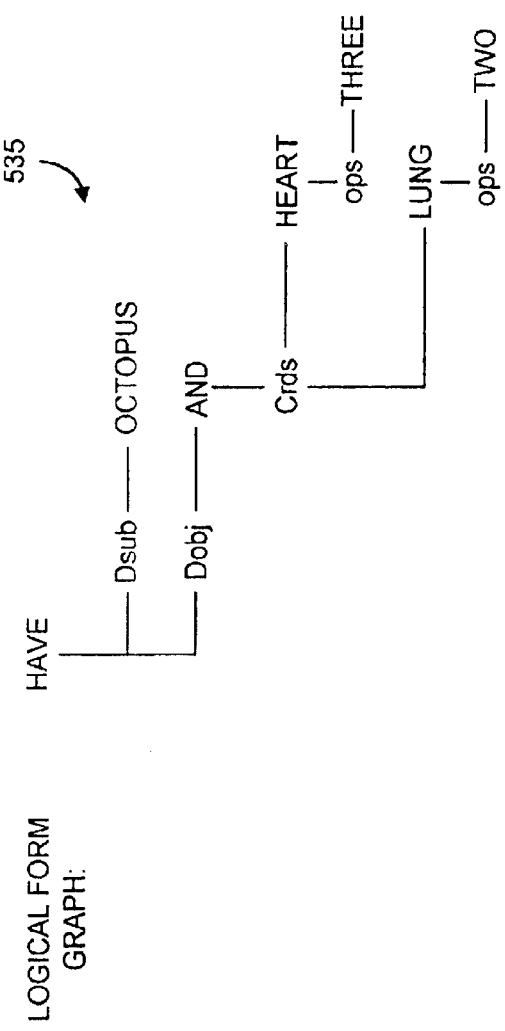
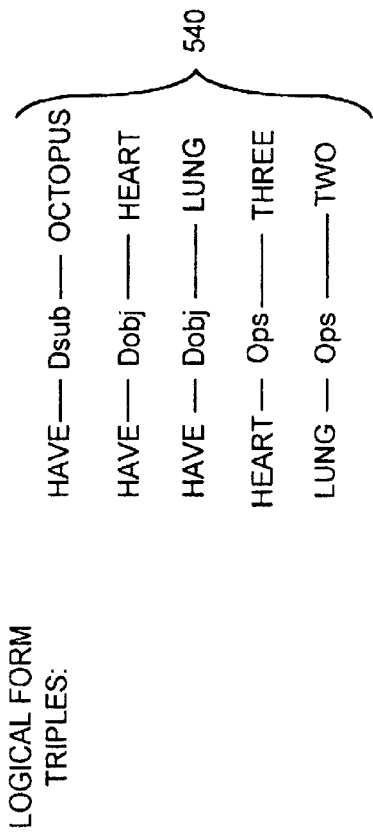
Fig. 5B

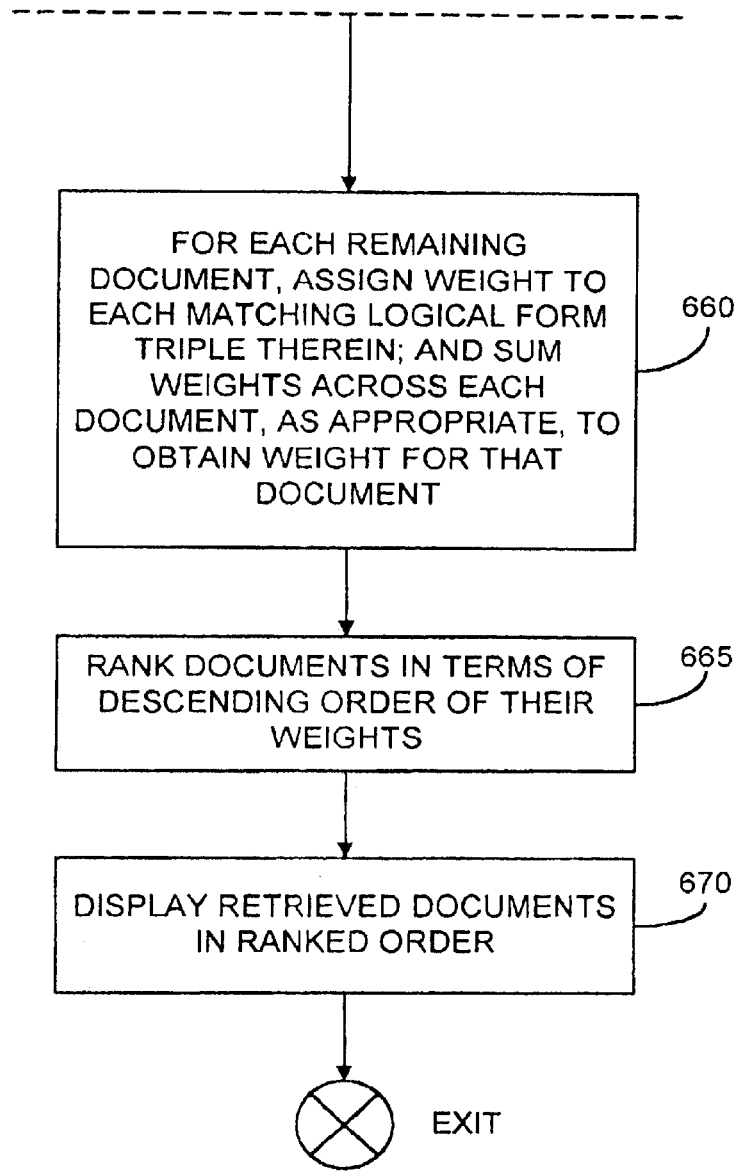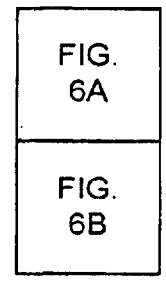
Fig. 6
Fig. 6B

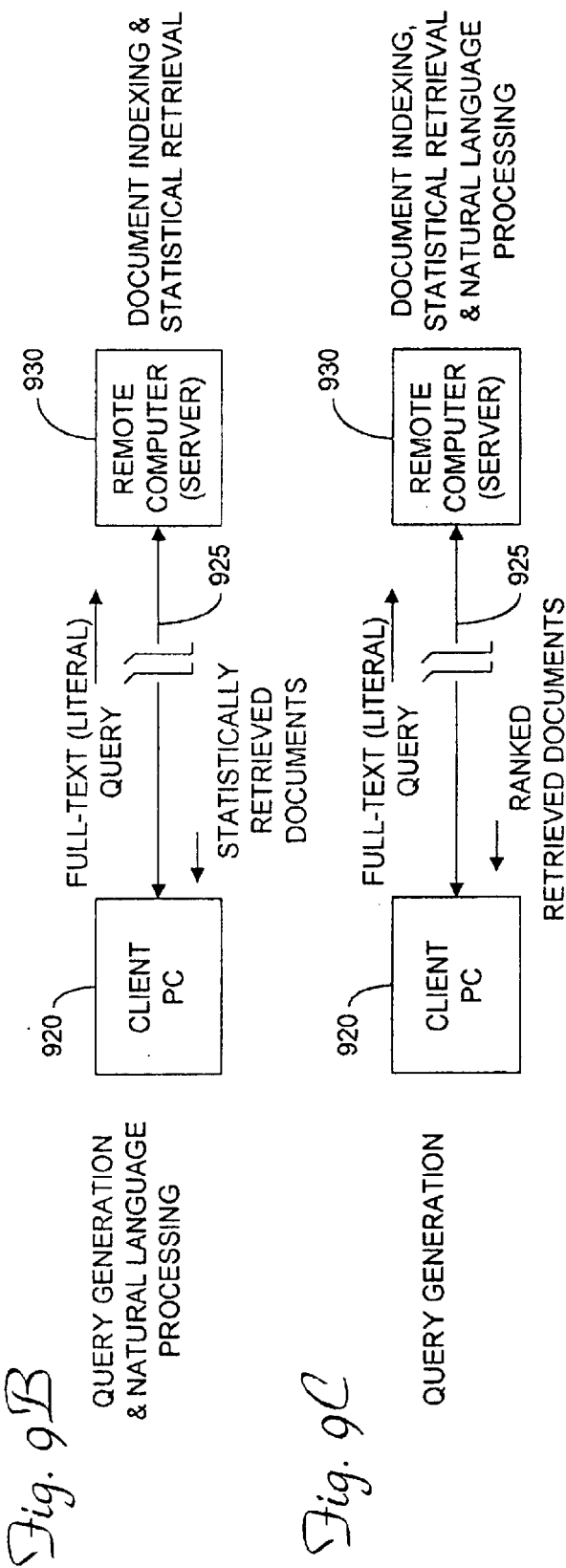

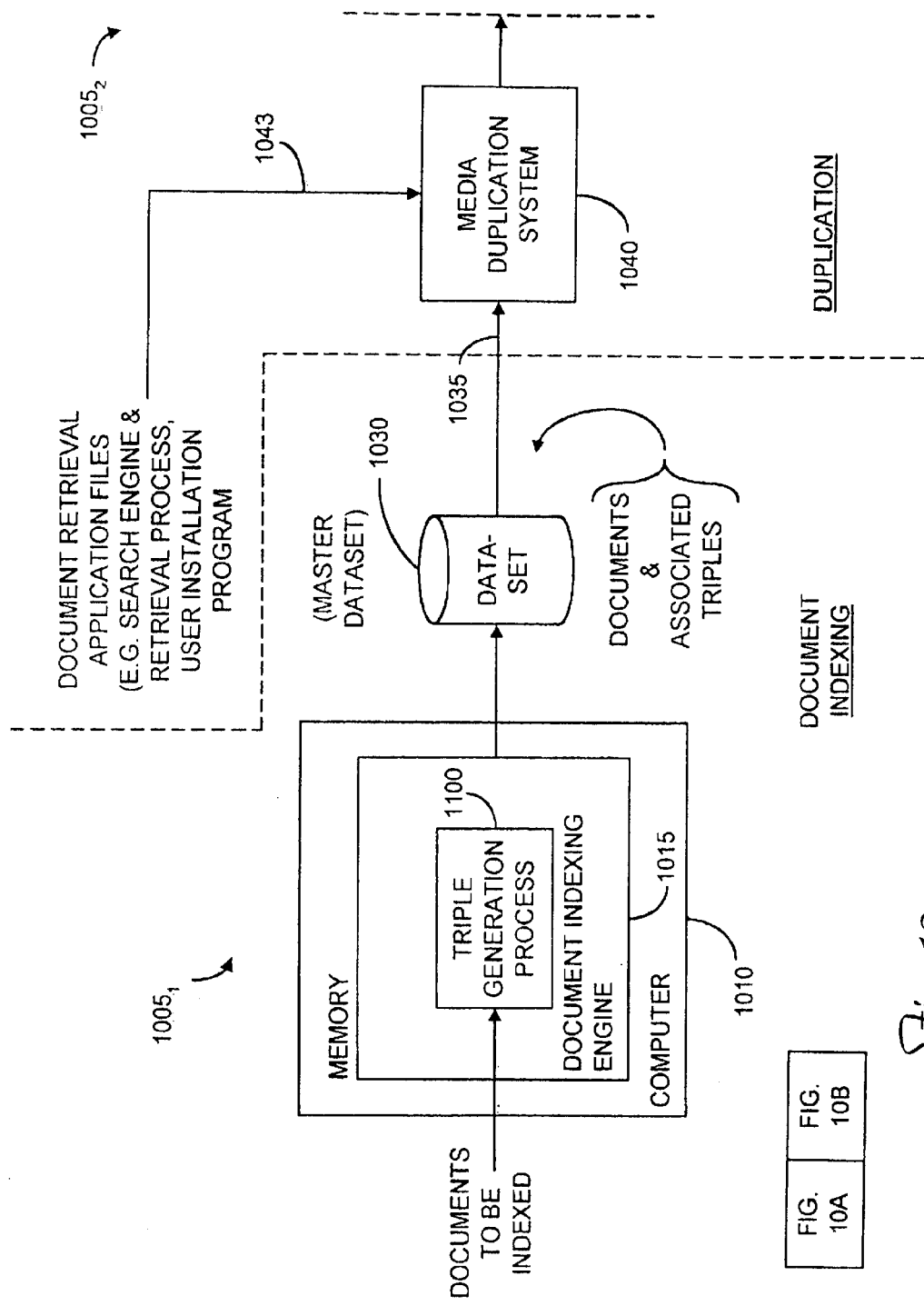

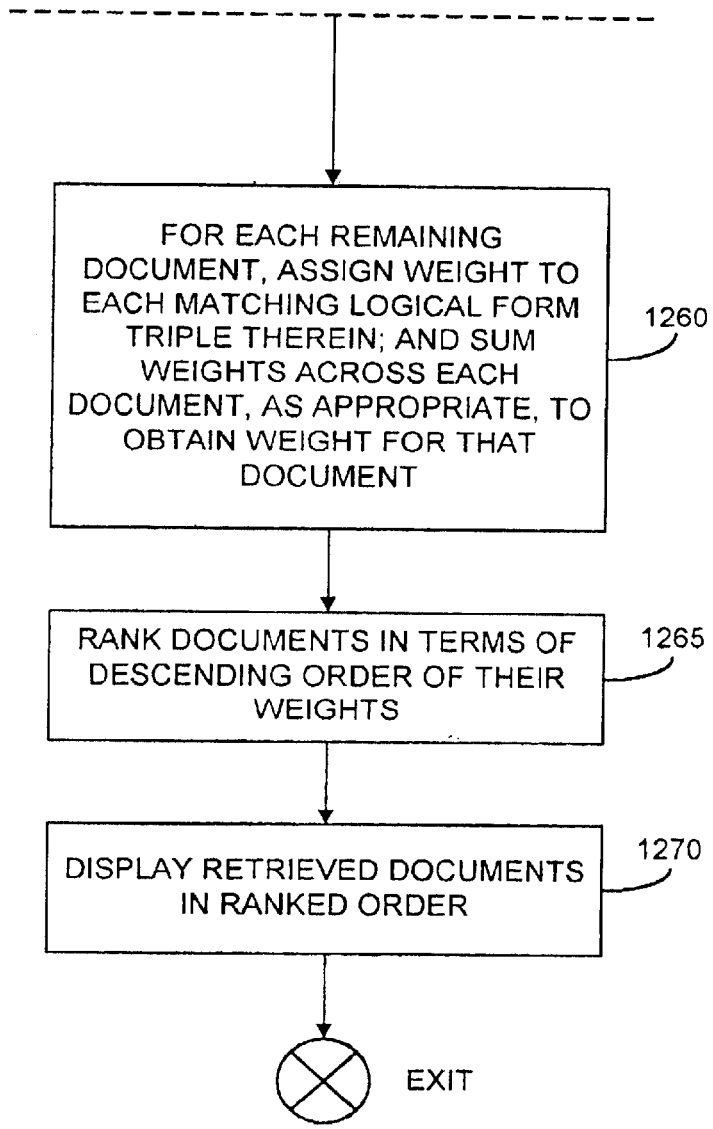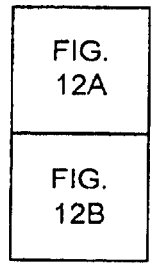
Fig. 12
Fig. 12B

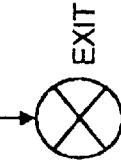

*Fig. 13B*
NLP ROUTINE 1350

ENTER → PROCESS INPUT TEXT, E.G. QUERY, TO YIELD LOGICAL FORM GRAPH (1360) → EXTRACT LOGICAL FORM TRIPLES FROM GRAPH (1370) → OUTPUT EACH LOGICAL FORM TRIPLE AS A DISTINCT FORMATTED STRING (1380) → FOR QUERY, STORE EACH LOGICAL FORM TRIPLE THEREFOR IN MEMORY 1075 (1390) → EXIT

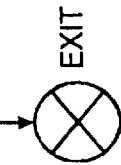

*Fig. 13A*
NLP ROUTINE 1300

ENTER → PROCESS INPUT TEXT, E.G. QUERY, TO YIELD LOGICAL FORM GRAPH (1310) → EXTRACT LOGICAL FORM TRIPLES FROM GRAPH (1320) → OUTPUT EACH LOGICAL FORM TRIPLE AS A DISTINCT FORMATTED STRING (1330) → FOR CURRENT INPUT TEXT, STORE EACH LOGICAL FORM TRIPLE THEREFOR IN DATASET 1030 (1340) → EXIT

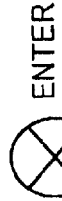

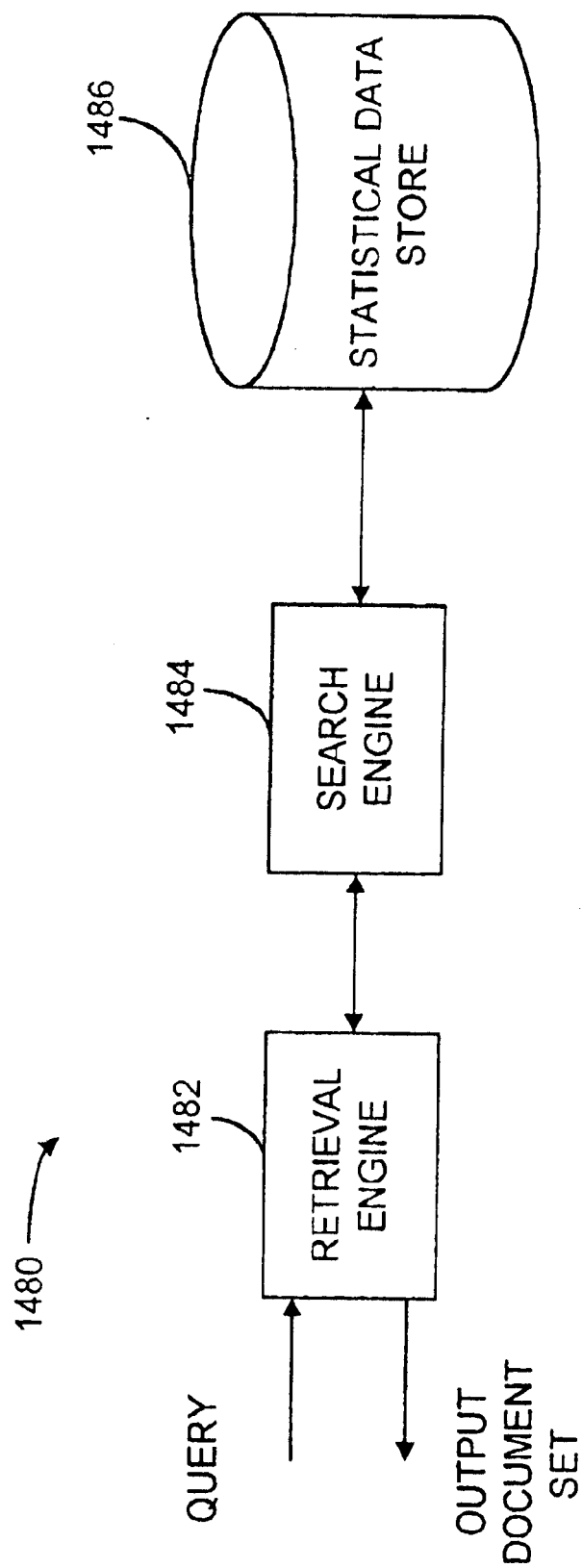

SYSTEM FOR PROCESSING TEXTUAL INPUTS USING NATURAL LANGUAGE PROCESSING TECHNIQUES

REFERENCE TO CO-PENDING APPLICATION

The present application is a continuation-in-part of co-pending U.S. patent application Ser. No. 08/898,652, entitled "APPARATUS AND METHODS FOR AN INFORMATION RETRIEVAL SYSTEM THAT EMPLOYS NATURAL LANGUAGE PROCESSING OF SEARCH RESULTS TO IMPROVE OVERALL PRECISION", filed Jul. 22, 1997 now U.S. Pat. No. 5,933,822, which is hereby fully incorporated by reference and assigned to the same assignee as the present application.

The following co-pending U.S. patent application is hereby fully incorporated by reference: U.S. patent application Ser. No. 08/674,610 entitled "METHOD AND SYSTEM FOR COMPUTING SEMANTIC LOGICAL FORMS FROM SYNTAX TREES", filed on Jun. 28, 1996, and assigned to the same assignee as the present application.

BACKGROUND OF THE INVENTION

The present invention deals with processing textual inputs. More specifically, the present invention relates to using natural language processing techniques in order to determine similarity between textual inputs. The present invention is useful in a wide variety of applications, such as information retrieval, machine translation, natural language understanding, document similarity/clustering, etc. However, the present invention will be described primarily in the context of information retrieval, for illustrative purposes only.

Generally, information retrieval is a process by which a user finds and retrieves information, relevant to the user, from a large store of information. In performing information retrieval, it is important to retrieve all of the information a user needs (i.e., it is important to be complete) and at the same time it is important to limit the irrelevant information that is retrieved for the user (i.e., it is important to be selective). These dimensions are often referred to in terms of recall (completeness) and precision (selectivity). In many information retrieval systems, it is important to achieve good performance across both the recall and precision dimensions.

In some current retrieval systems, the amount of information that can be queried and searched is very large. For example, some information retrieval systems are set up to search information on the internet, digital video discs, and other computer data bases in general. The information retrieval systems are typically embodied as, for example, internet search engines and library catalog search engines. Further, even within the operating system of a conventional desktop computer, certain types of information retrieval mechanisms are provided. For example, some operating systems provide a tool by which a user can search all files on a given database or on a computer system based upon certain terms input by the user.

Many information retrieval techniques are known. A user input query in such techniques is typically presented as either an explicit user generated query, or an implicit query, such as when a user requests documents which are similar to a set of existing documents. Typical information retrieval systems search documents in the larger data store at either a single word level, or at a term level. Each of the documents is assigned a relevancy (or similarity) score, and the information retrieval system presents a certain subset of the documents searched to the user, typically that subset which has a relevancy score which exceeds a given threshold.

The rather poor precision of conventional statistical search engines stems from their assumption that words are independent variables, i.e., words in any textual passage occur independently of each other. Independence in this context means that a conditional probability of any one word appearing in a document given the presence of another word therein is always zero, i.e., a document simply contains an unstructured collection of words or simply put a "bag of words". As one can readily appreciate, this assumption, with respect to any language, is grossly erroneous. English, like other languages, has a rich and complex syntactic and lexico-semantic structure with words whose meanings vary, often widely, based on the specific linguistic context in which they are used, with the context determining in any one instance a given meaning of a word and what word(s) can subsequently appear. Hence, words that appear in a textual passage are simply not independent of each other, rather they are highly inter-dependent. Keyword based search engines totally ignore this fine-grained linguistic structure. For example, consider an illustrative query expressed in natural language: "How many hearts does an octopus have?" A statistical search engine, operating on content words "hearts" and "octopus", or morphological stems thereof, might likely return or direct a user to a stored document that contains a recipe that has at its ingredients and hence its content words: "artichoke hearts, squid, onions and octopus". This engine, given matches in the two content words "octopus" and "hearts", may determine, based on statistical measures, e.g. including proximity and logical operators, that this document is an excellent match, when, in reality, the document is quite irrelevant to the query.

The art teaches various approaches for extracting elements of syntactic phrases as head-modifier pairs in unlabeled relations. These elements are then indexed as terms (typically without internal structure) in a conventional statistical vector-space model.

One example of such an approach is taught in J. L. Fagan, "Experiments in Automatic Phrase Indexing for Document Retrieval: A Comparison of Syntactic and Non-Syntactic Methods", Ph.D. Thesis, Cornell University, 1988, pages i-261. Specifically, this approach uses natural language processing to analyze English sentences and extract syntactic phrasal constituents elements wherein these phrasal constituents are then treated as terms and indexed in an index using a statistical vector-space model. During retrieval, the user enters a query in natural language which, under this approach, is subjected to natural language processing for analysis and to extract elements of syntactic phrasal constituents analogous to the elements stored in the index. Thereafter, attempts are made to match the elements of the syntactic phrasal constituents from the query to those stored in the index. The author contrasts this purely syntactic approach to a statistical approach, in which a stochastic method is used to identify elements within syntactic phrases. The author concludes that natural language processing does not yield substantial improvements over stochastic approaches, and that the small improvements in precision that natural language processing does sometimes produce do not justify the substantial processing cost associated with natural language processing.

Another such syntactic based-approach is described, in the context of using natural language processing for selecting appropriate terms for inclusion within search queries, in T. Strzalkowski, "Natural Language Information Retrieval: TIPSTER-2 Final Report", *Proceedings of Advances in Text*

*Processing: Tipster Program Phase 2*, DARPA, 6–8 May 1996, Tysons Corner, Va. pages 143–148 (hereinafter the "DARPA paper"); and T. Strzalkowski, "Natural Language Information Retrieval", *Information Processing and Management*, Vol. 31, No. 3, 1995, pages 397–417. While this approach offers theoretical promise, the author on pages 147–8 of the DARPA paper, concludes that, owing to the sophisticated processing required to implement the underlying natural language techniques, this approach is currently impractical:

" . . . [I]t is important to keep in mind that NLP [natural language processing] techniques that meet our performance requirements (or at least are believed to be approaching these requirements) are still fairly unsophisticated in their ability to handle natural language text. In particular, advanced processing involving conceptual structuring, logical forms, etc. is still beyond reach, computationally. It may be assumed that these advanced techniques will prove even more effective, since they address the problem of representation-level limits; however, the experimental evidence is sparse and necessarily limited to rather small scale tests".

A further syntactic-based approach of this sort is described in B. Katz, "Annotating the World Wide Web using Natural Language", *Conference Proceedings of RIAO 97, Computer-Assisted Information Searching in Internet*, McGill University, Quebec, Canada, 25–27 June 1997, Vol. 1, pages 136–155 [hereinafter the "Katz publication"]. As described in the Katz publication, subject-verb-object expressions are created while preserving the internal structure so that during retrieval minor syntactic alternations can be accommodated.

Because these syntactic approaches have yielded lackluster improvements or have not been feasible to implement in natural language processing systems available at the time, the field has moved away from attempting to directly improve the precision and recall of the initial results of query to improvements in the user interface, i.e. specifically through methods for refining the query based on interaction with the user, such as through "find-similar" user responses to a retrieved result, and methods for visualizing the results of a query including displaying results in appropriate clusters.

While these improvements are useful in their own right, the added precision attainable through these improvements is still disappointingly low, and certainly insufficient to drastically reduce user frustration inherent in keyword searching. Specifically, users are still required to manually sift through relatively large sets of documents that are only sparsely populated with relevant responses.

SUMMARY OF THE INVENTION

In accordance with one illustrative embodiment, the present invention provides a method and apparatus for determining similarity between two textual inputs. A first set of logical forms is obtained for the first textual input, and a second set of logical forms is obtained for the second textual input. The first and second sets of logical forms are compared, and similarity between the first and second textual inputs is determined based on the comparison.

Broadly speaking, this processing involves production, comparison and optionally weighting of matching logical forms respectively associated with the first and second textual inputs. A logical form is a directed graph in which words representing text of any arbitrary size are linked by labeled relations. In particular, a logical form portrays structural relationships (i.e., syntactic and semantic relationships), particularly argument and/or adjunct relationships, between important words in an input string. This portrayal can take various specific forms, such as, a logical form graph or any sub-graph thereof, the latter including, for example, a list of logical form triples, with each of the triples being illustratively of a form "word-relation-word"; wherein, any one of these forms can be used with our invention.

In accordance with one aspect of the present invention, each textual input is subjected to natural language processing, illustratively morphological, syntactic and semantic, to ultimately produce appropriate logical forms for each sentence in each textual input. The set of logical forms for the first textual input is then compared to the set of logical forms associated with the second textual input in order to ascertain a match between logical forms.

Similarity, as used herein, means obtaining some measure for how close two textual inputs are with respect to either semantic and syntactic structure or lexical meaning, or both.

In accordance with one illustrative application, information retrieval systems are based, in part, on natural language processing. Semantic information is used to capture more information about either the documents being searched, or the queries, or both, in order to achieve better performance or accuracy. Generally, such systems use natural language processing techniques in an attempt to match the semantic content of a first textual input (such as the queries) to that of a second textual input (such as the documents being searched). Such systems represent a significant advancement in the art, particularly with respect to obtaining increased precision in the information retrieval process.

Specifically, the input query is converted to one or more logical forms, and the documents retrieved by a search engine are also converted to logical forms. The logical forms for the query are compared against those for the documents. Documents whose logical forms precisely match the logical forms corresponding to the query are ranked and presented to the user.

In accordance with another aspect of the present invention, the stringency associated with the above-described matching process is reduced by using paraphrased logical forms. For example, in the information retrieval application, there may be a need to reduce the stringency in the filtering process in order to prevent discarding relevant documents. For example, at times, a document that the query (or keyword search) correctly includes in the recall set will be incorrectly discarded. This can occur when keywords from the query occur in the document, but not in the precise syntactic/semantic relationship required by the logical form generated for the query. Such an incorrectly discarded document can be illustrated by the following example. It should be noted that the example discusses logical form triples, but other subgraphs of a logical form can be used as well. Assume that the query is as follows:

How do spiders eat their victims?

The logical form triples generated for the query will be:

eat; Dsub; spider eat; Dobj; victim

A relevant document may include the sentence "Many spiders consume their victims . . . ". Logical form triples generated for that sentence will be as follows:

consume; Dsub; spider consume; Dobj; victim

Since none of the logical form triples corresponding to the document precisely matches any of the logical form triples corresponding to the query, the document is discarded, even though it may be highly relevant.

In addition, there may be need to discard irrelevant documents which would otherwise be presented to the user. For example, a certain class of logical forms may appear with a high degree of frequency in documents in the large data store being searched. Such logical forms may also be commonly present in queries, regardless of the subject matter of the query. For instance, assume that the query is:

Tell me about dogs.

One logical form triple generated for the query will be:

tell; Dobj; me

This may well appear in many documents which have nothing to do with dogs. Thus, such irrelevant documents will be presented to the user.

Thus, in accordance with one aspect of the present invention, one or both sets of logical forms (for one or both textual inputs) is modified, such as by paraphrasing the set of logical forms or suppressing certain logical forms. The modified set or sets of logical forms is/are used in the matching process.

In an illustrative information retrieval system, the system filters documents in a document set retrieved from a document store in response to a query. The system obtains a first set of logical forms based on a selected one of the query and the documents in the document set. The system obtains a second set of logical forms based on another of the query and the documents in the document set. The system then uses natural language processing techniques to modify the first logical forms to obtain a modified set of logical forms. The system filters documents in the document set based on a predetermined relationship between the modified set of logical forms and the second set of logical forms.

In accordance with one aspect of the present invention, the natural language processing techniques are used to obtain a first set of paraphrased logical forms indicative of paraphrases of the first set of logical forms. In accordance with another aspect of the present invention, the natural language processing techniques suppress a first predetermined class of logical forms to obtain a first suppressed set of logical forms. Filtering is then conducted based upon the set of paraphrased logical forms and/or the suppressed set of logical forms.

In one embodiment, the query is received and query logical forms are computed based on the query. The query is run and documents are retrieved based on the query. Logical forms are either computed or retrieved from a data store for each document retrieved. High frequency query logical forms are suppressed, and paraphrased logical forms are computed based on the query logical forms. The paraphrased query logical forms are matched against the document logical forms.

BRIEF DESCRIPTION OF THE DRAWINGS

FIGS. 5A–5D depict different corresponding examples of English language sentences of varying complexity and corresponding logical form elements therefor;

FIG. 6 depicts the correct alignment of the drawing sheets for FIGS. 6A and 6B;

FIGS. 6A and 6B collectively depict a flowchart of our inventive Retrieval process 600;

FIGS. 9A–9C respectively depict three different embodiments of information retrieval systems that incorporate the teachings of our present invention;

FIG. 10 depicts the correct alignment of the drawing sheets for FIGS. 10A and 10B;

FIGS. 10A and 10B collectively depict yet another embodiment of our present invention wherein the logical form triples for each document are precomputed and stored, along with the document record therefor, for access during a subsequent document retrieval operation;

FIG. 12 depicts the correct alignment of the drawing sheets for FIGS. 12A and 12B;

FIGS. 12A and 12B collectively depict a flowchart of our inventive Retrieval process 1200 that is executed within computer system 300 shown in FIGS. 10A and 10B;

FIG. 13A depicts a flowchart of NLP routine 1300 which is executed within Triple Generation process 1100; and FIG. 13B depicts a flowchart of NLP routine 1350 which is executed within Retrieval process 1200.

FIG. 14 is a functional block diagram illustrating one embodiment of the present invention.

DETAILED DESCRIPTION OF THE PREFERRED EMBODIMENTS

Overview

The present invention utilizes natural language processing techniques to create sets of logical forms corresponding to a first textual input and a second textual input. The present invention determines similarity between the first and second textual inputs based on a comparison of the sets of logical forms. In accordance with another aspect of the present invention, one or both of the sets of logical forms is modified, such as by obtaining paraphrases or suppressing certain logical forms. While the present invention is contemplated for use in a wide variety of applications, it is described herein, primarily in the context of information retrieval, for the purpose of illustration only.

In the information retrieval embodiment, the present invention creates sets of logical forms corresponding to an input query, and corresponding to a document set returned in response to the input query. The present invention also utilizes natural language processing techniques to modify the logical forms corresponding to either the query, the document set, or both. In one embodiment, the modified logical forms are expanded to include paraphrases. In another embodiment, the modified logical forms are processed to suppress a predetermined class of logical forms which have not proven useful in discriminating among various documents. By modifying the logical forms in this way, the present invention reduces the stringency associated with matching techniques, and thus increases both precision and recall in the information retrieval process.

It should be noted that he present discussion proceeds, in part, with reference to logical form triples having a form indicated by a word, a syntactic or semantic relation, and another word. However, the present invention contemplates that other subgraphs of a logical form could be used as well, and all are collectively referred to herein as logical forms.

After considering the following description, those skilled in the art will clearly realize that the teachings of our present invention can be readily utilized in many applications and nearly any information retrieval system to increase the precision of a search engine used therein, regardless of whether that engine is a conventional statistical engine or not. Moreover, our invention can be utilized to improve precision in retrieving textual information from nearly any type of mass data store, e.g. a database whether stored on magnetic, optical (e.g. a CD-ROM) or other media, and regardless of any particular language in which the textual information exists, e.g. English, Spanish, German and so forth.

Figure 1:
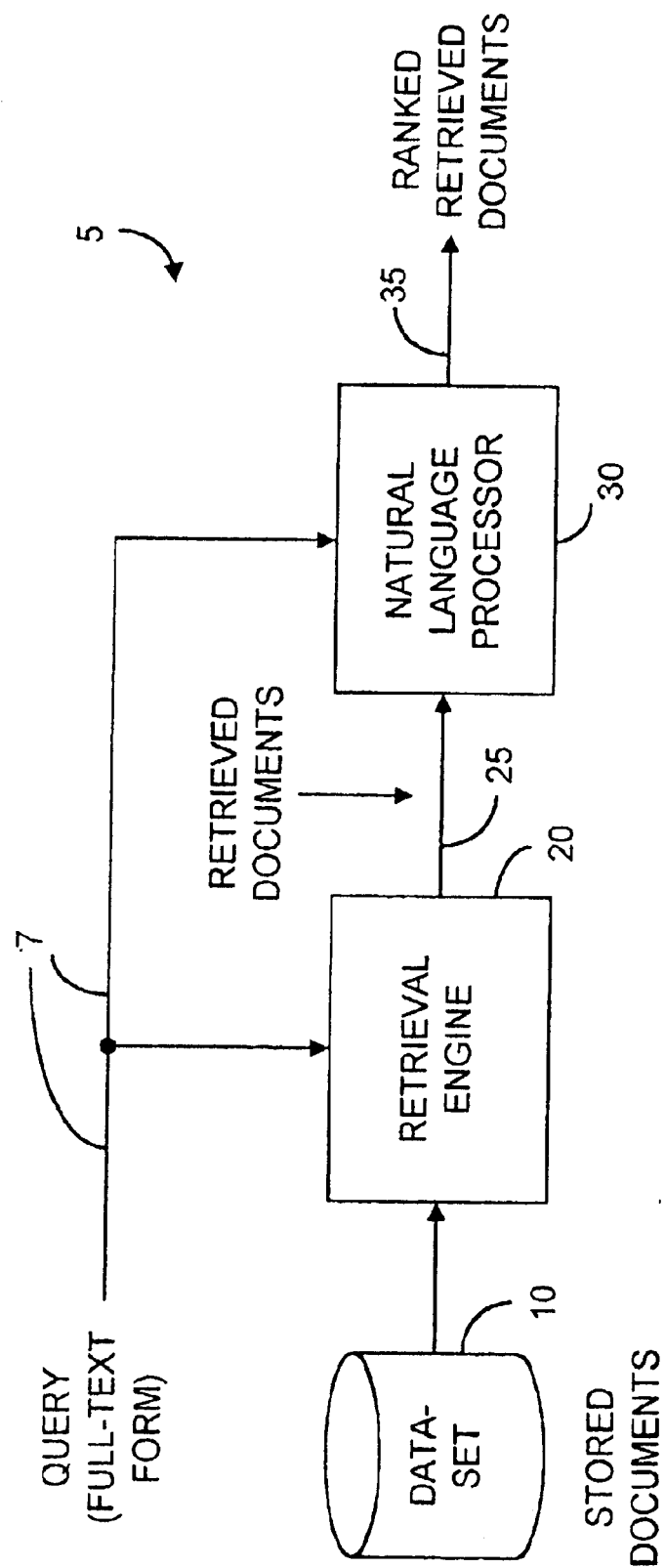
FIG. 1 depicts a very high-level block diagram of information retrieval system 5 in accordance with our present invention.

With this in mind, FIG. 1 depicts a very high-level block diagram of information retrieval system 5 that utilizes our invention. System 5 is formed of conventional retrieval engine 20, e.g. a keyword based statistical retrieval engine, followed by processor 30. Processor 30 utilizes our inventive natural language processing technique, as described below, to filter and re-rank documents produced by engine 20 to yield an ordered set of retrieved documents that are more relevant to a user-supplied query than would otherwise arise.

Specifically, in operation, a user supplies a search query to system 5. The query should be in full-text (commonly referred to as "literal") form in order to take full advantage of its semantic content through natural language processing and thus provide an increase in precision over that associated with engine 20 alone. System 5 applies this query both to engine 20 and processor 30. In response to the query, engine 20 searches through dataset 10 of stored documents to yield a set of retrieved documents therefrom. This set of documents (also referred to herein as an "output document set") is then applied, as symbolized by line 25, as an input to processor 30. Within processor 30, as discussed in detail below, each of the documents in the set is subjected to natural language processing, illustratively morphological, syntactic and logical form, to produce logical forms for each sentence in that document. Each such logical form for a sentence encodes, for example, semantic relationships, particularly argument and adjunct structure, between words in a linguistic phrase in that sentence. Processor 30 analyzes the query in an identical fashion to yield a set of corresponding logical forms therefor. Processor 30 then compares the set of forms for the query against the sets of logical forms associated with each of the documents in the set in order to ascertain any match between logical forms in the query set and logical forms for each document. Documents that produce no matches are eliminated from further consideration. Each remaining document that contains at least one logical form which matches the query logical form is retained and heuristically scored by processor 30. As will be discussed below, each different relation type, i.e., such as deep subject, deep object, operator and the like, that can occur in a logical form triple is assigned a predefined weight. The total weight (i.e., score) of each such document is, e.g., the sum of the weights of all its uniquely matching triples, i.e. with duplicate matching triples being ignored. Finally, processor 30 presents the retained documents to the user rank-ordered based on their score, typically in groups of a predefined number, e.g. five or ten, starting with those documents that have the highest score.

Inasmuch as system 5 is very general purpose and can be adapted to a wide range of different applications, then, to simplify the following discussion, we will discuss use of our invention in one illustrative context. That context will be an information retrieval system that employs a conventional keyword based statistical Internet search engine to retrieve stored records of English-language documents indexed into a dataset from the world wide web. Each such record generally contains predefined information, as set forth below, for a corresponding document. For other search engines, the record may contain the entire document itself. Though the following discussion addresses our invention in the context of use with a conventional Internet search engine that retrieves a record containing certain information about a corresponding document including a web address at which that document can be found, generically speaking, the ultimate item retrieved by that engine is, in fact, the document, even though an intermediate process, using that address, is generally employed to actually access the document from the web. After considering the following description, those skilled in the art will readily appreciate how our present invention can be easily adapted for use in any other information retrieval application.

Figure 2:
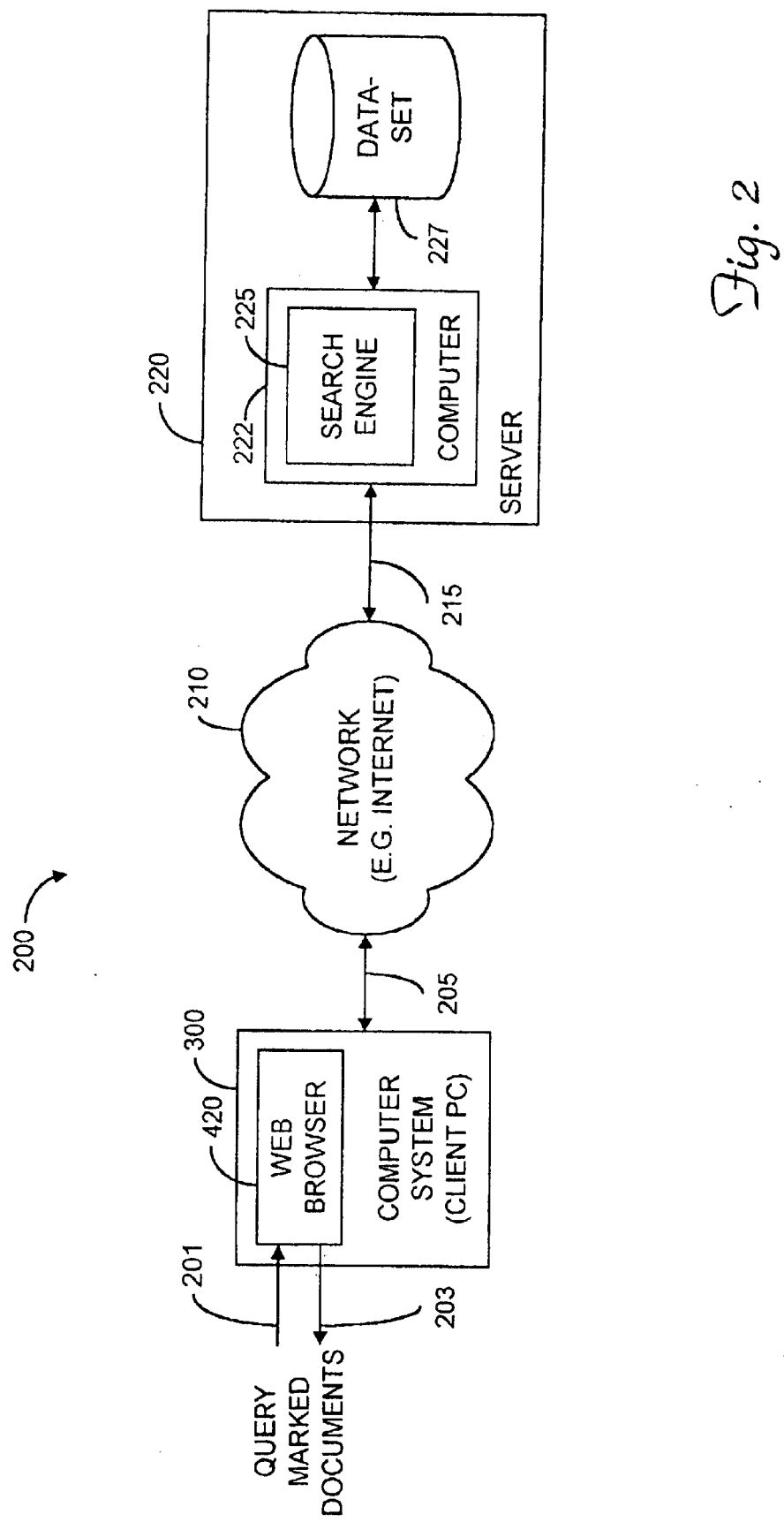
FIG. 2 depicts a high-level embodiment of information retrieval system 200, of the type shown in FIG. 1, that utilizes the teachings of our present invention.

FIG. 2 depicts a high-level block diagram of a particular embodiment of our invention used in the context of an Internet search engine. Our invention will principally be discussed in detail in the context of this particular embodiment. As shown, system 200 contains computer system 300, such as a client personal computer (PC), connected, via network connection 205, through network 210 (here the Internet, though any other such network, e.g. an intranet, could be alternatively used), and network connection 215, to server 220. The server typically contains computer 222 which hosts Internet search engine 225, typified by, e.g., the ALTA VISTA search engine (ALTA VISTA is a registered trademark of Digital Equipment Corporation of Maynard, Mass.) and is connected to mass data store 227, typically a dataset of document records indexed by the search engine and accessible through the World Wide Web on the Internet. Each such record typically contains: (a) a web address (commonly referred to as a uniform resource locator—URL) at which a corresponding document can be accessed by a web browser, (b) predefined content words which appear in that document, along with, in certain engines, a relative address of each such word relative to other content words in that document; (c) a short summary, often just a few lines, of the document or a first few lines of the document; and possibly (d) a description of the document as provided in its hypertext markup language (HTML) description field.

A user stationed at computer system 300 establishes an Internet connection, through, e.g., an associated web browser (such as based on the "Internet Explorer" version 4.0 browser available from the Microsoft Corporation and appropriately modified to include our inventive teachings) executing at this system to server 220 and particularly to search engine 222 executing thereat. Thereafter, the user enters a query, here symbolized by line 201, to the browser which, in turn, sends the query, via system 300 and through the Internet connection to server 220, to search engine 225. The search engine then processes the query against document records stored within dataset 227 to yield a set of retrieved records, for documents, that the engine determines is relevant to the query. Inasmuch as the manner through which engine 225 actually indexes documents to form document records for storage in data store 227 and the actual analysis which the engine undertakes to select any such stored document record are both irrelevant to the present invention, we will not discuss either of these aspects in any further detail. Suffice it to say, that in response to the query, engine 225 returns a set of retrieved document records, via the Internet connection, back to web browser 420. Browser 420, simultaneously while engine 225 is retrieving documents and/or subsequent thereto, analyzes the query to yield its corresponding set of logical form triples. Once the search engine completes its search and has retrieved a set of document records and has supplied that set to the browser, the corresponding documents (i.e., to form an output document set) are themselves accessed by the browser from associated web servers (the datasets associated therewith collectively forming a "repository" of stored documents; such a repository can also be a stand-alone dataset as well, such as in, e.g., a self-contained CD-ROM based data retrieval application). The browser, in turn, then analyzes each of the accessed documents (i.e., in the output document set) to form a corresponding set of logical form triples for each such document. Thereafter, as discussed in detail below, browser 420, based on matching logical form triples between the query and the retrieved documents, scores each document having such a match and presents the user with those documents, as symbolized by line 203, ranked in terms of descending score, typically in a group of a predefined small number of documents having the highest rankings, then followed, if the user so selects through the browser, by the next such group and so forth until the user has examined a sufficient number of the documents so presented. Though FIG. 2 depicts our invention as illustratively utilizing a network connection to obtain document records and documents from a remote server, our invention is not so limited. As will be discussed in detail below, in conjunction with FIG. 9A, such a networked connection is not necessary where the retrieval application and our invention are both executed on a common computer, i.e. a local PC, and an accompanying dataset, e.g. stored in CD-ROM or other suitable media, is situated and accessible thereat.

Figure 3:
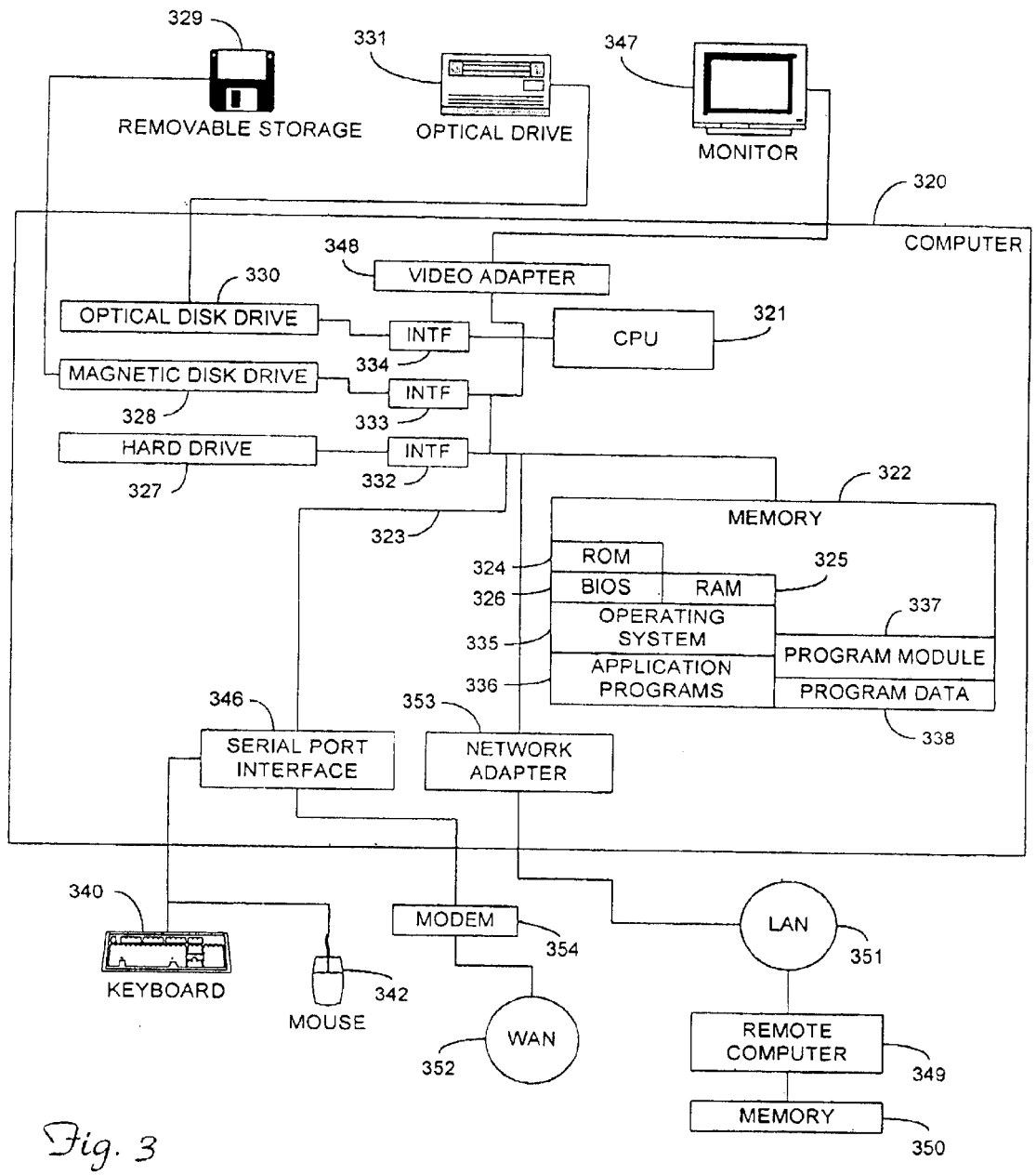
FIG. 3 depicts a block diagram of computer system 300, specifically a client personal computer, that is contained within system 200 shown in FIG. 2.

FIG. 3 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the invention includes a general purpose computing device in the form of a conventional personal computer 320, including processing unit 321 (which may include one or more processors), a system memory 322, and a system bus 323 that couples various system components including the system memory to the processing unit 321. The system bus 323 may be any of several types of bus structures including a memory bus or memory controller, a peripheral bus, and a local bus using any of a variety of bus architectures. The system memory includes read only memory (ROM) 324 a random access memory (RAM) 325. A basic input/output 326 (BIOS), containing the basic routine that helps to transfer information between elements within the personal computer 320, such as during start-up, is stored in ROM 324. The personal computer 320 further includes a hard disk drive 327 for reading from and writing to a hard disk (not shown) a magnetic disk drive 328 for reading from or writing to removable magnetic disk 329, and an optical disk drive 330 for reading from or writing to a removable optical disk 331 such as a CD ROM or other optical media. The hard disk drive 327, magnetic disk drive 328, and optical disk drive 330 are connected to the system bus 323 by a hard disk drive interface 332, magnetic disk drive interface 333, and an optical drive interface 334, respectively. The drives and the associated computer-readable media provide nonvolatile storage of computer readable instructions, data structures, program modules and other data for the personal computer 320. Although the exemplary environment described herein employs a hard disk, a removable magnetic disk 329 and a removable optical disk 331, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 329, optical disk 331, ROM 324 or RAM 325, including an operating system 335, one or more application programs 336, other program modules 337, and program data 338. A user may enter commands and information into the personal computer 320 through input devices such as a keyboard 340 and pointing device 342. Other input devices (not shown) may include a microphone, joystick, game pad, satellite dish, scanner, or the like. These and other input devices are often connected to the processing unit 321 through a serial port interface 346 that is coupled to the system bus, but may be connected by other interfaces, such as a parallel port, game port or a universal serial bus (USB).

A monitor 347 or other type of display device is also connected to the system bus 323 via an interface, such as a video adapter 348. In addition to the monitor 347, personal computers may typically include other peripheral output devices (not shown), such as speakers and printers.

The personal computer 320 may operate in a networked environment using logic connections to one or more remote computers, such as a remote computer 349. The remote computer 349 may be another personal computer, a server, a router, a network PC, a peer device or other network node, and typically includes many or all of the elements described above relative to the personal computer 320, although only a memory storage device 350 has been illustrated in FIG. 1. The logic connections depicted in FIG. 1 include a local are network (LAN) 351 and a wide area network (WAN) 352. Such networking environments are commonplace in offices, enterprise-wide computer network intranets and the Internet.

When used in a LAN networking environment, the personal computer 320 is connected to the local area network 351 through a network interface or adapter 353. When used in a WAN networking environment, the personal computer 320 typically includes a modem 354 or other means for establishing communications over the wide area network 352, such as the Internet. The modem 354, which may be internal or external, is connected to the system bus 323 via the serial port interface 346. In a network environment, program modules depicted relative to the personal computer 320, or portions thereof, may be stored in the remote memory storage devices. It will be appreciated that the network connections shown are exemplary and other means of establishing a communications link between the computers may be used.

Figure 4:
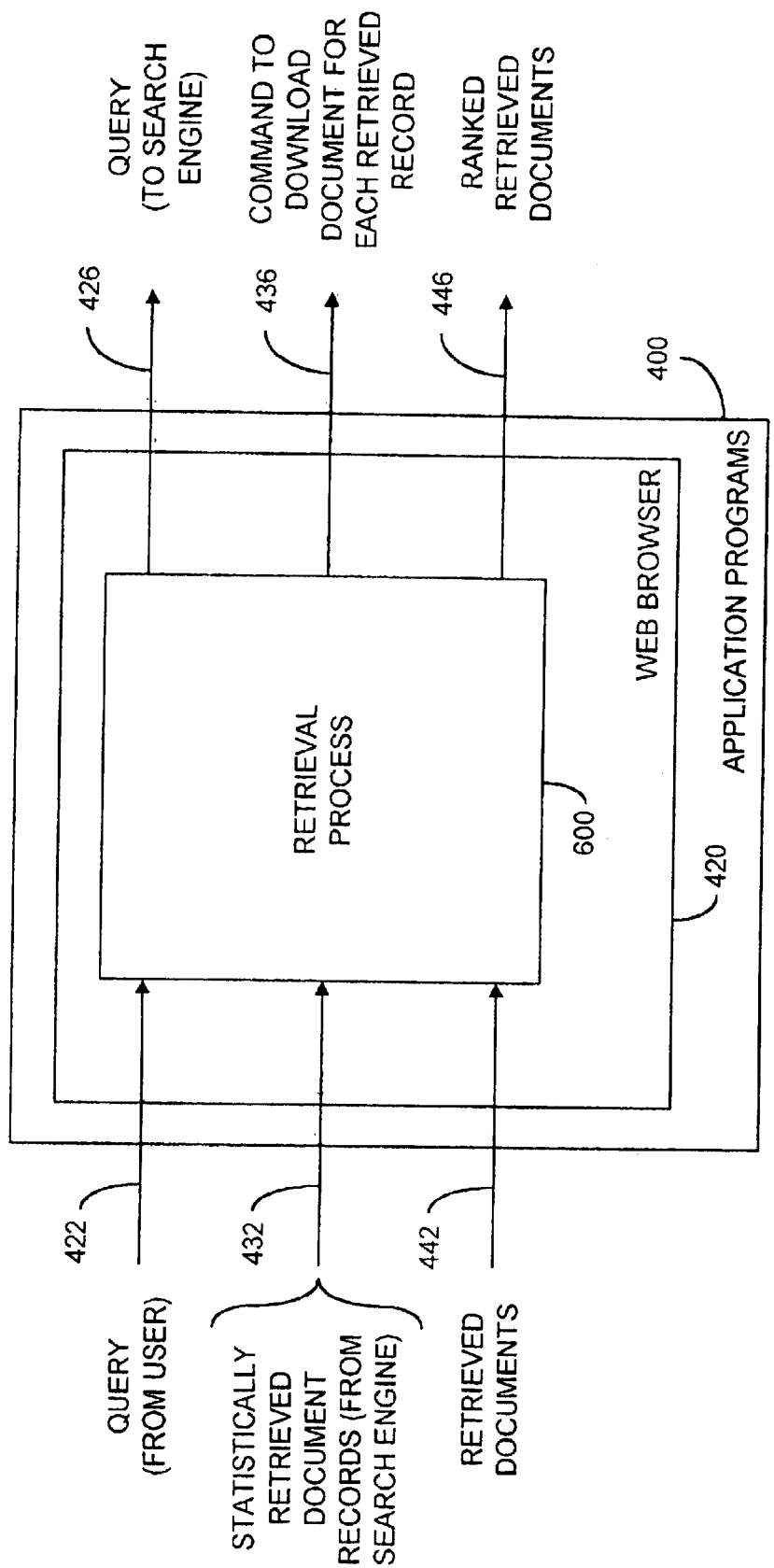
FIG. 4 depicts a very-high level block diagram of application programs 400 that execute within computer 300 shown in FIG. 3.

FIG. 4 depicts a very-high level block diagram of application programs 400 that execute within computer 300 shown in FIG. 3. These programs, to the extent relevant to the present invention, include, as shown in FIG. 4, web browser 420 which, for implementing our present invention, comprises retrieval process 600 (which will be discussed below in detail in conjunction with FIGS. 6A and 6B) Assuming an Internet connection is established between the web browser and, e.g., a user-selected statistical search engine, such as the ALTA VISTA search engine, the user then supplies, as symbolized by line 422 shown in FIG. 4, process 600 with a full-text ("literal") search query. This process forwards, as symbolized by line 426, the query through the web browser to the search engine. In addition, though not specifically shown, process 600 also internally analyzes the query to produce its corresponding logical form triples which are then locally stored within computer 300. In response to the query, the search engine supplies, as symbolized by line 432, process 600 with a set of statistically retrieved document records. Each of these records includes, as noted above, a web address, specifically a URL, at which that document can be accessed and appropriate command(s) required by a remote web server, at which that document resides, sufficient to download, over the Internet, a computer file containing that document. Once process 600 receives all the records, this process then sends, via web browser 420 and as symbolized by line 436, the appropriate commands to access and download all the documents specified by the records (i.e., to form the output document set). These documents are then accessed, in seriatim, from their corresponding web servers and downloaded to web browser 420 and specifically process 600, as symbolized by line 442. Once these documents are downloaded, process 600 analyzes each such document to produce and locally store the corresponding logical form triples therefor. Thereafter, through comparing the logical form triples for the query against those for each document, process 600 scores each document that contains at least one matching logical form triple, then ranks these particular documents based on their scores, and finally instructs web browser 400 to present these particular documents, as symbolized by line 446, in ranked order by descending document score on a group-by-group basis to the user. Browser 400 generates a suitable selection button, on a screen of display 380 (see FIG. 3), through which the user can select, by appropriately "clicking" thereon with his(her) mouse, to display each successive group of documents, as desired.

To fully appreciate the utility of logical forms in determining, preserving and encoding semantic information, at this point, we will digress from discussing the processing that implements our invention to illustrate and describe, to the extent relevant, logical form and logical form triples as used in the present invention and provide a brief overview of the manner through which they are produced.

Broadly speaking, a logical form is a directed graph in which words representing text of any arbitrary size are linked by labeled relations. A logical form portrays semantic relationships between important words in a phrase, which may include hypernyms and/or synonyms thereof. As will be discussed and illustrated in FIGS. 5A–5D, a logical form can take on any one of a number of different forms, e.g. a logical form graph or any sub-graph thereof such as, for example, a list of logical form triples, each of the triples being illustratively of a form "word-relation-word". While our present invention, as specifically embodied, generates and compares logical form triples, our invention can readily utilize any other form, such as those noted above, that can portray a semantic relationship between words all of which are encompassed in the term logical form, as used herein.

Figure 5A:
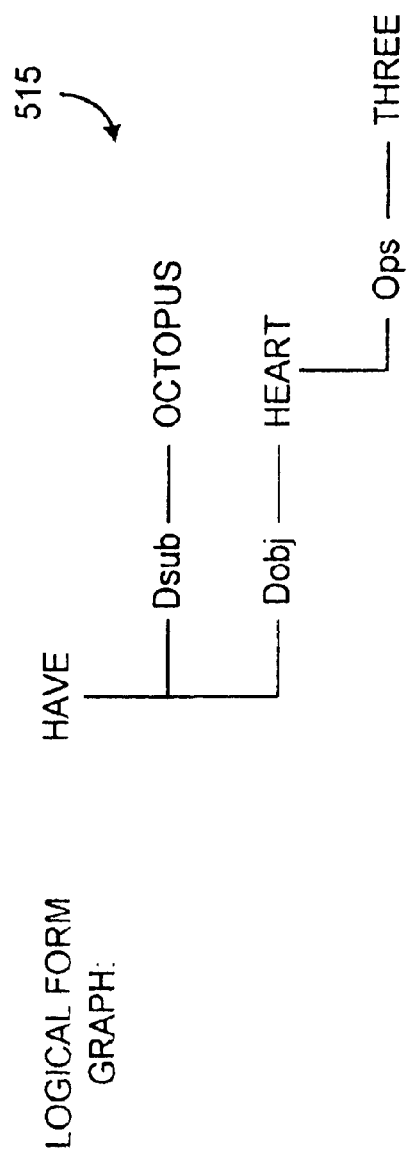

Since logical form triples and their construction can best be understood through a series of examples of increasingly complex sentences, first consider FIG. 5A. This figure depicts logical form graph 515 and logical form triples 525 for illustrative input string 510, specifically a sentence "The octopus has three hearts.".

In general, in one illustrative embodiment, to generate logical form triples for an illustrative input string, e.g. for input string 510, that string is first parsed into its constituent words. Thereafter, using a predefined record (not to be confused with document records employed by a search engine), in a stored lexicon, for each such word, the corresponding records for these constituent words, through predefined grammatical rules, are themselves combined into larger structures or analyses which are then, in turn, combined, again through predefined grammatical rules, to form even larger structures, such as a syntactic parse tree. A logical form graph is then built from the parse tree. Whether a particular rule will be applicable to a particular set of constituents is governed, in part, by presence or absence of certain corresponding attributes and their values in the word records. The logical form graph is then converted into a series of logical form triples. Illustratively, our invention uses such a lexicon having approximately 165,000 head word entries. This lexicon includes various classes of words, such as, e.g., prepositions, conjunctions, verbs, nouns, operators and quantifiers that define syntactic and semantic properties inherent in the words in an input string so that a parse tree can be constructed therefor. Clearly, a logical form (or, for that matter, any other representation, such as logical form triples or logical form graph within a logical form, capable of portraying a semantic relationship) can be precomputed, while a corresponding document is being indexed, and stored, within, e.g., a record for that document, for subsequent access and use rather than being computed later once that document has been retrieved. Using such precomputation and storage, as occurs in another embodiment of our invention discussed in detail below in conjunction with FIGS. 10–13B, drastically and advantageously reduces the amount of natural language processing, and hence execution time associated therewith, required to handle any retrieved document in accordance with our invention.

In particular, in one illustrative embodiment, an input string, such as sentence 510 shown in FIG. 5A, is first morphologically analyzed, using the predefined record in the lexicon for each of its constituent words, to generate a so-called "stem" (or "base") form therefor. Stem forms are used in order to normalize differing word forms, e.g., verb tense and singular-plural noun variations, to a common morphological form for use by a parser. Once the stem forms are produced, the input string is syntactically analyzed by the parser, using the grammatical rules and attributes in the records of the constituent words, to yield the syntactic parse tree therefor. This tree depicts the structure of the input string, specifically each word or phrase, e.g. noun phrase "The octopus", in the input string, a category of its corresponding grammatical function, e.g., NP for noun phrase, and link(s) to each syntactically related word or phrase therein. For illustrative sentence 510, its associated syntactic parse tree would be:

TABLE 1

SYNTACTIC PARSE TREE

```
DECL
    ---NP       - - DETP-ADJ* "The"

- - NOUN* "octopus"
    ---VERB* has
    ---NP       - - QUANP-ADJ* "three"

- - NOUN* "hearts"
    ---CHAR "."
``` for "The octopus has three hearts."

A start node located in the upper-left hand corner of the tree defines the type of input string being parsed. Sentence types include "DECL" (as here) for a declarative sentence, "IMPR" for an imperative sentence and "QUES" for a question. Displayed vertically to the right and below the start node is a first level analysis. This analysis has a head node indicated by an asterisk, typically a main verb (here the word "has"), a premodifier (here the noun phrase "The octopus"), followed by a postmodifier (the noun phrase "three hearts"). Each leaf of the tree contains a lexical term or a punctuation mark. Here, as labels, "NP" designates a noun phrase, and "CHAR" denotes a punctuation mark.

The syntactic parse tree is then further processed using a different set of rules to yield a logical form graph, such as graph 515 for input string 510. The process of producing a logical form graph involves extracting underlying structure from syntactic analysis of the input string; the logical form graph includes those words that are defined as having a semantic relationship therebetween and the functional nature of the relationship. The "deep" cases or functional roles used to categorize different semantic relationships include:

TABLE 2

| Dsub -- | deep subject |
|---|---|
| Dind -- | deep indirect object |
| Dobj -- | deep object |
| Dnom -- | deep predicate nominative |
| Dcmp -- | deep object complement. |

To identify all the semantic relationships in an input string, each node in the syntactic parse tree for that string is examined. In addition to the above relationships, other semantic roles are used, e.g. as follows:

TABLE 3

| PRED -- | predicate |
|---|---|
| PTCL -- | particle in two-part verbs |
| Ops -- | Operator, e.g. numerals |
| Nadj -- | adjective modifying a noun |
| Dadj -- | predicate adjective |
| PROPS -- | otherwise unspecified modifier that is a clause |
| MODS -- | otherwise unspecified modifier that is not a clause |

Additional semantic labels are defined as well, for example:

TABLE 4

| TmeAt -- | time at which |
|---|---|
| LocAt -- | location |

In any event, the results of such analysis for input string 510 is logical form graph 515. Those words in the input string that exhibit a semantic relationship therebetween (such as, e.g. "Octopus" and "Have") are shown linked to each other with the relationship therebetween being specified as a linking attribute (e.g. Dsub). This graph, typified by graph 515 for input string 510, captures the structure of arguments and adjuncts for each input string. Among other things, logical form analysis maps function words, such as prepositions and articles, into features or structural relationships depicted in the graph. Logical form analysis also, in one embodiment, resolves anaphora, i.e., defining a correct antecedent relationship between, e.g., a pronoun and a co-referential noun phrase; and detects and depicts proper functional relationships for ellipsis. Additional processing may well occur during logical form analysis in an attempt to cope with ambiguity and/or other linguistic idiosyncrasies. Corresponding logical form triples are then simply read in a conventional manner from the logical form graph and stored as a set. Each triple contains two node words as depicted in the graph linked by a semantic relationship therebetween. For illustrative input string 510, logical form triples 525 result from processing graph 515. Here, logical form triples 525 contain three individual triples that collectively convey the semantic information inherent in input string 510.

Figure 5C:
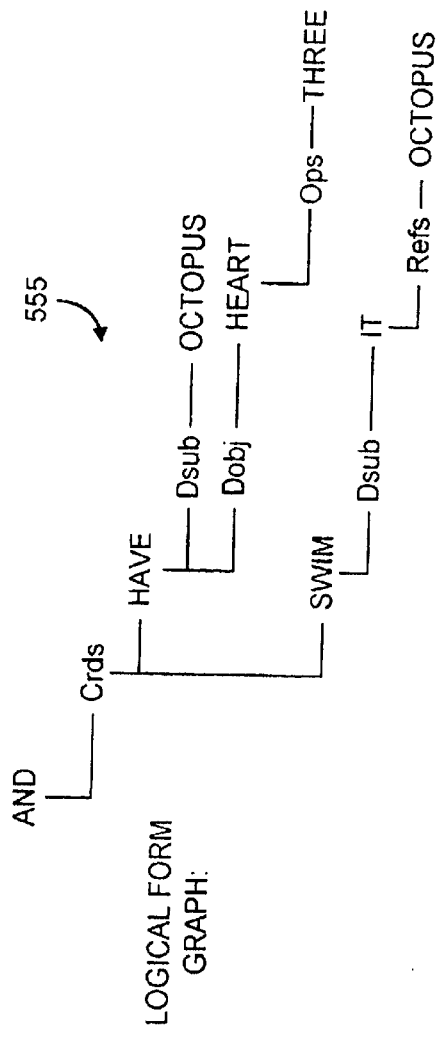
Figure 5D:
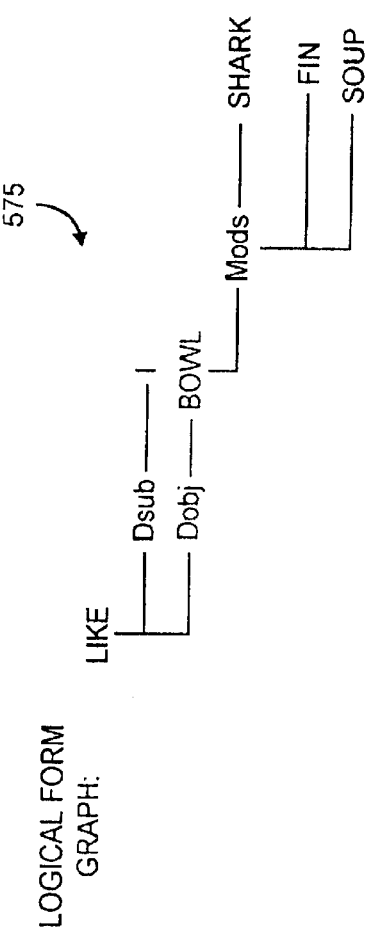

Similarly, as shown in FIGS. 5B–5D, for input strings 530, 550 and 570, specifically exemplary sentences "The octopus has three hearts and two lungs.", "The octopus has three hearts and it can swim.", and "I like shark fin soup bowls.", logical form graphs 535, 555 and 575, as well as logical form triples 540, 560 and 580, respectively result.

There are three logical form constructions for which additional natural language processing is required to correctly yield all the logical form triples, apart from the conventional manner, including a conventional "graph walk", in which logical form triples are created from the logical form graph. In the case of coordination, as in exemplary sentence "The octopus has three hearts and two lungs", i.e. input string 530, a logical form triple is created for a word, its semantic relation, and each of the values of the coordinated constituent. According to a "special" graph walk, we find in FIG. 540 two logical form triples "have-Dobj-heart" and "have-Dobj-lung". Using only a conventional graph walk, we would have obtained only one logical form triple "have-Dobj-and". Similarly, in the case of a constituent which has referents (Refs), as in exemplary sentence "The octopus has three hearts and it can swim", i.e. input string 550, we create a logical form triple for a word, its semantic relation, and each of the values of the Refs attribute, in additional to the triples generated by the conventional graph walk. According to this special graph walk, we find in triples 560 the logical form triple "swim-Dsub-octopus" in addition to the conventional logical form triple "swim-Dsub-it". Finally, in the case of a constituent with noun modifiers, as in the exemplary sentence "I like shark fin soup bowls", i.e. input string 570, additional logical form triples are created to represent possible internal structure of the noun compounds. The conventional graph walk created the logical form triples "bowl-Mods-shark", "bowl-Mods-fin" and bowl-Mods-soup", reflecting the possible internal structure [[shark] [fin] [soup] bowl]. In the special graph walk, we create additional logical form triples to reflect the following possible internal structures [[shark fin] [soup] bowl] and [[shark] [fin soup] bowl] and [[shark [fin] soup] bowl], respectively: "fin-Mods-shark", "soup-Mods-fin", and "soup-Mods-shark".

Inasmuch as the specific details of the morphological, syntactic, and logical form processing are not relevant to the present invention, we will omit any further details thereof. However, for further details in this regard, the reader is referred to co-pending United States patent applications entitled "Method and System for Computing Semantic Logical Forms from Syntax Trees", filed Jun. 28, 1996 and assigned Ser. No. 08/674,610 and particularly "Information Retrieval Utilizing Semantic Representation of Text", filed Mar. 7, 1997 and assigned Ser. No. 08/886,814; both of which have been assigned to the present assignee hereof and are incorporated by reference herein.

Figure 6A:
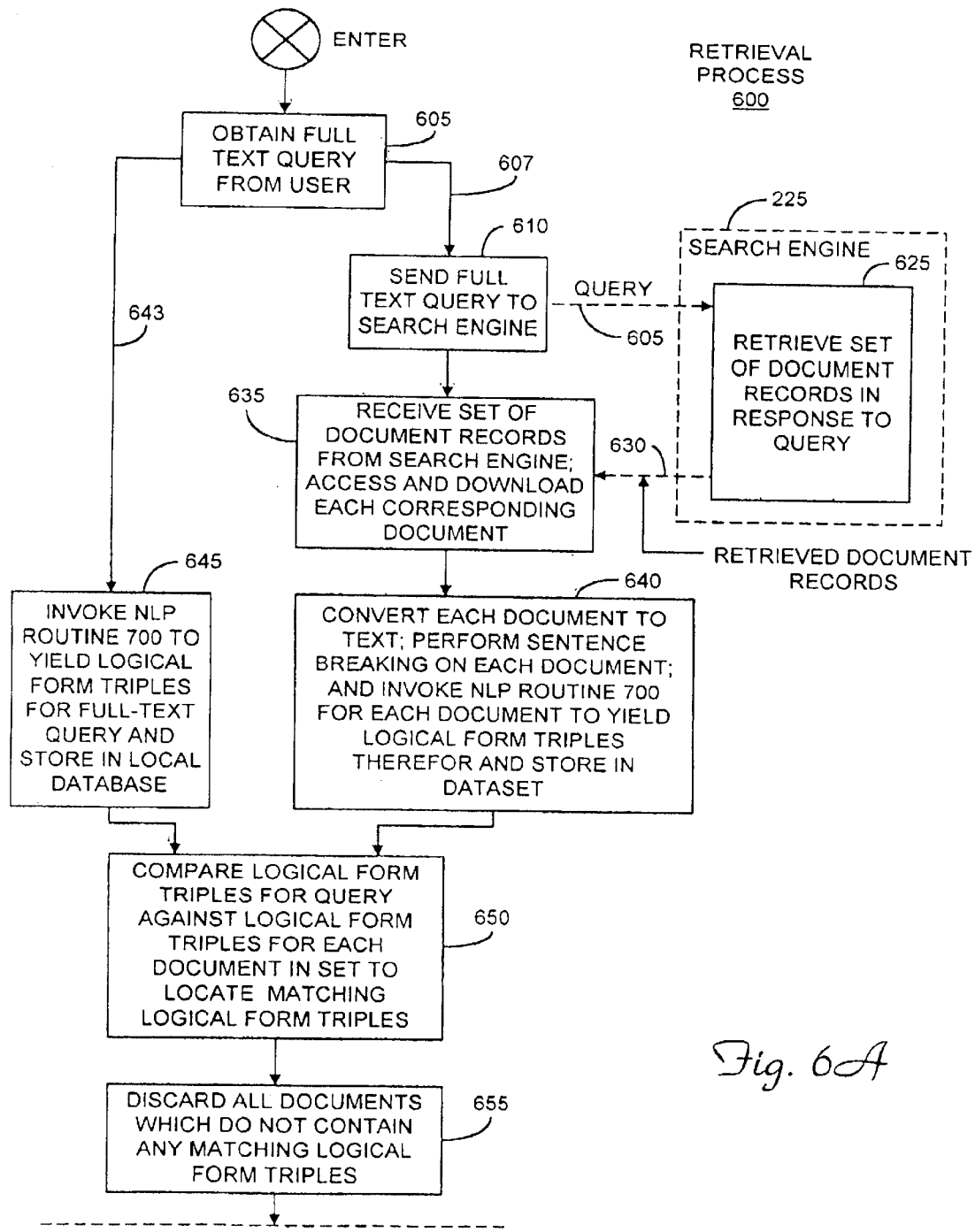

With this overview of logical forms and their construction in mind, we will now return to discussing the processing that implements our present invention. A flowchart of our invention utilized in retrieval process 600, as used in the specific embodiment of our invention shown in FIGS. 2, 3 and 4, is collectively depicted in FIGS. 6A and 6B; for which the correct alignment of the drawing sheets for these figures is shown in FIG. 6. With exception of the operations shown in dashed block 225, the remaining operations shown in these figures are performed by computer system, e.g. client PC 300 (see FIGS. 2 and 3) and specifically within web browser 420. To simplify understanding, the reader should simultaneously refer to FIGS. 2, 3 and 6A–6B throughout the following discussion.

Upon entry into process 600, execution proceeds first to block 605. This block, when executed, prompts a user to enter a full-text (literal) query through web browser 420. The query can be in the form of a single question (e.g. "Are there any air-conditioned hotels in Bali?") or a single sentence (e.g. "Give me contact information for all fireworks held in Seattle during the month of July.") or a sentence fragment (e.g. "Clothes in Ecuador"). Once this query is obtained, execution splits and proceeds, via path 607, to block 610 and, via path 643, to path 645. Block 645, when performed, invokes NLP routine 700 to analyze the query and construct and locally store its corresponding set of logical form triples. Block 610, when performed, transmits, as symbolized by dashed line 615, the full-text query from web browser 420, through an Internet connection, to a remote search engine, such as engine 225 situated on server 220. At this point, block 625 is performed by the search engine to retrieve a set of document records in response to the query. Once this set is formed, the set is transmitted, as symbolized by dashed line 630, by the remote server back to computer system 300 and specifically to web browser 420 executing thereat. Thereafter, block 635 is performed to receive the set of records, and then for each record: extract a URL from that record, access a web site at that URL and download therefrom an associated file containing a document corresponding to that record. Once all the documents have been downloaded, block 640 is performed. For each such document, this block first extracts all the text from that document, including any text situated within HTML tags associated with that document. Thereafter, to facilitate natural language processing which operates on a single sentence at a time, the text for each document is broken into a text file, through a conventional sentence breaker, in which each sentence (or question) occupies a separate line in the file. Thereafter, block 640 repeatedly invokes NLP routine 700 (which will be discussed in detail below in conjunction with FIG. 7), for each line of text in that document, to analyze each of these documents and construct and locally store a corresponding set of logical form triples for each line of text in that document. Though the operations in block 645 have been discussed as being performed essentially in parallel with those in blocks 610, 635 and 640, the operations in the former block, based on actual implementation considerations, could be performed serially either before or after the operations in blocks 610, 635 and 640. Alternatively, as in the case of another embodiment of our invention as discussed below in conjunction with FIGS. 10–13B, the logical form triples for each document can be precomputed and stored for subsequent access and use during document retrieval, in which case, these triples would simply be accessed rather than computed during document retrieval. In this case, the triples may have been stored, in some manner, as properties of that stored document or as, e.g., a separate entry in either the record for that document or in the dataset containing that document.

In any event and returning to process 600 shown in FIGS. 6A and 6B, once the sets of logical form triples have been constructed and fully stored for both the query and for each of the retrieved documents in the output document set, block 650 is performed. This block compares each of the logical form triples in the query against each of the logical form triples for each of the retrieved documents to locate a match between any triple in the query and any triple in any of the documents. An illustrative form of matching is defined as an identical match between two triples both in terms of the node words as well as in the relation type in these triples. In particular, for an illustrative pair of logical form triples: word1a-relation1-word2a and word1b-relation2-word2b, a match only occurs if the node words word1a and word1b are identical to each other, node words word2a and word2b are identical to each other, and relation1 and relation2 are the same. Unless all three elements of one triple identically match corresponding elements of another triple, these two triples do not match. Once block 650 completes, block 655 is performed to discard all retrieved documents that do not exhibit a matching triple, i.e., having no triple that matches any triple in the query. Thereafter, block 660 is performed. Through block 660, all remaining documents are assigned a score, based on the relation type(s) of matching triples and their weights, that exist for each of those documents. In particular, each different type of relation that can arise in a logical form triple is assigned a corresponding weight, such as those shown in table 800 in FIG. 8A. For example, as shown, illustrative relations Dobj, Dsub, Ops and Nadj may be assigned predetermined static numeric weights of 100, 75, 10 and 10, respectively. The weight reflects a relative importance ascribed to that relation in indicating a correct semantic match between a query and a document. The actual numeric values of these weights are generally defined on an empirical basis. As described in detail in conjunction with FIG. 8B below, for each remaining document, its score is a predefined function, illustratively here a numeric sum, of the weights of its unique matching triples (ignoring all duplicate matching triples). Once the documents are so weighted, block 665 is performed to rank order the documents in order of descending score. Finally, block 670 is performed to display the documents in rank order, typically in terms of a small predefined group of documents, typically five or ten, that exhibit the highest scores. Thereafter, the user, can by, for example, appropriately "clicking" his(her) mouse on a corresponding button displayed by web browser 420, have computer system (client PC) 300 display the next group of ranked documents, and so forth until the user has sufficiently examined all the ranked documents in succession, at which point process 600 is completed.

Figure 7:
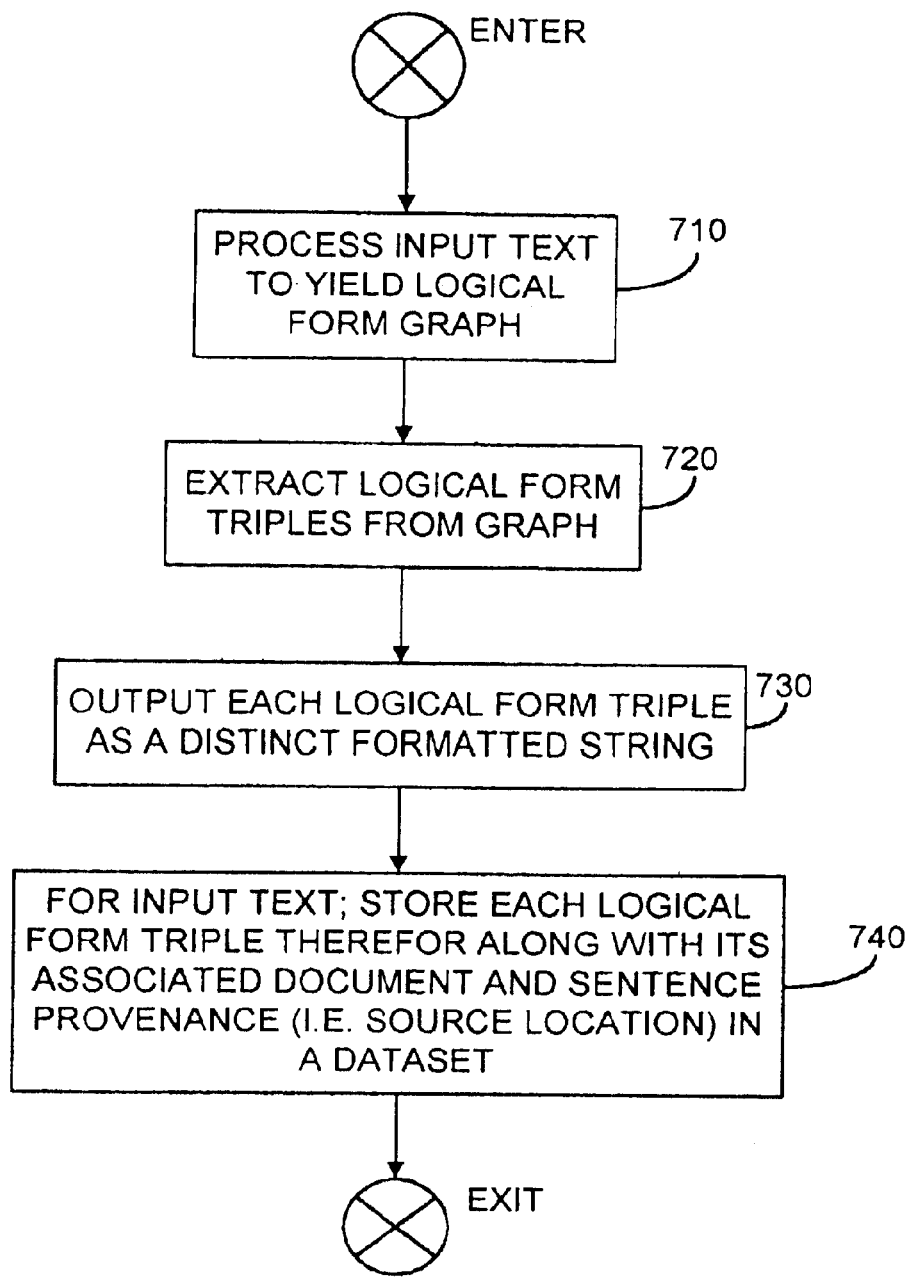
FIG. 7 depicts a flowchart of NLP routine 700 that is executed within process 600.

FIG. 7 depicts a flowchart of NLP routine 700. This routine, given a single line of input text—whether it be a query, sentence in a document, or text fragment, constructs the corresponding logical form triples therefor.

In particular, upon entry into routine 700, block 710 is first executed to process a line of input text to yield a logical form graph, such as illustrative graph 515 shown in FIG. 5A. This processing illustratively includes morphological and syntactic processing to yield a syntactic parse tree from which a logical form graph is then computed. Thereafter, as shown in FIG. 7, block 720 is performed to extract (read) a set of corresponding logical form triples from the graph. Once this occurs, block 730 is executed to generate each such logical form triple as a separate and distinct formatted text string. Finally, block 740 is executed to store, in a dataset (or database), the line of input text and, as a series of formatted text strings, the set of logical form triples for that line. Once this set has been completely stored, execution exits from block 700. Alternatively, if in lieu of logical form triples, a different representation, e.g. a logical form graph, associated with a logical form is to be used in conjunction with our invention, then blocks 720 and 730 would be readily modified to generate that particular form as the formatted string, with block 740 storing that form in lieu of logical form triples into the dataset.

Figures 8A, 8B:
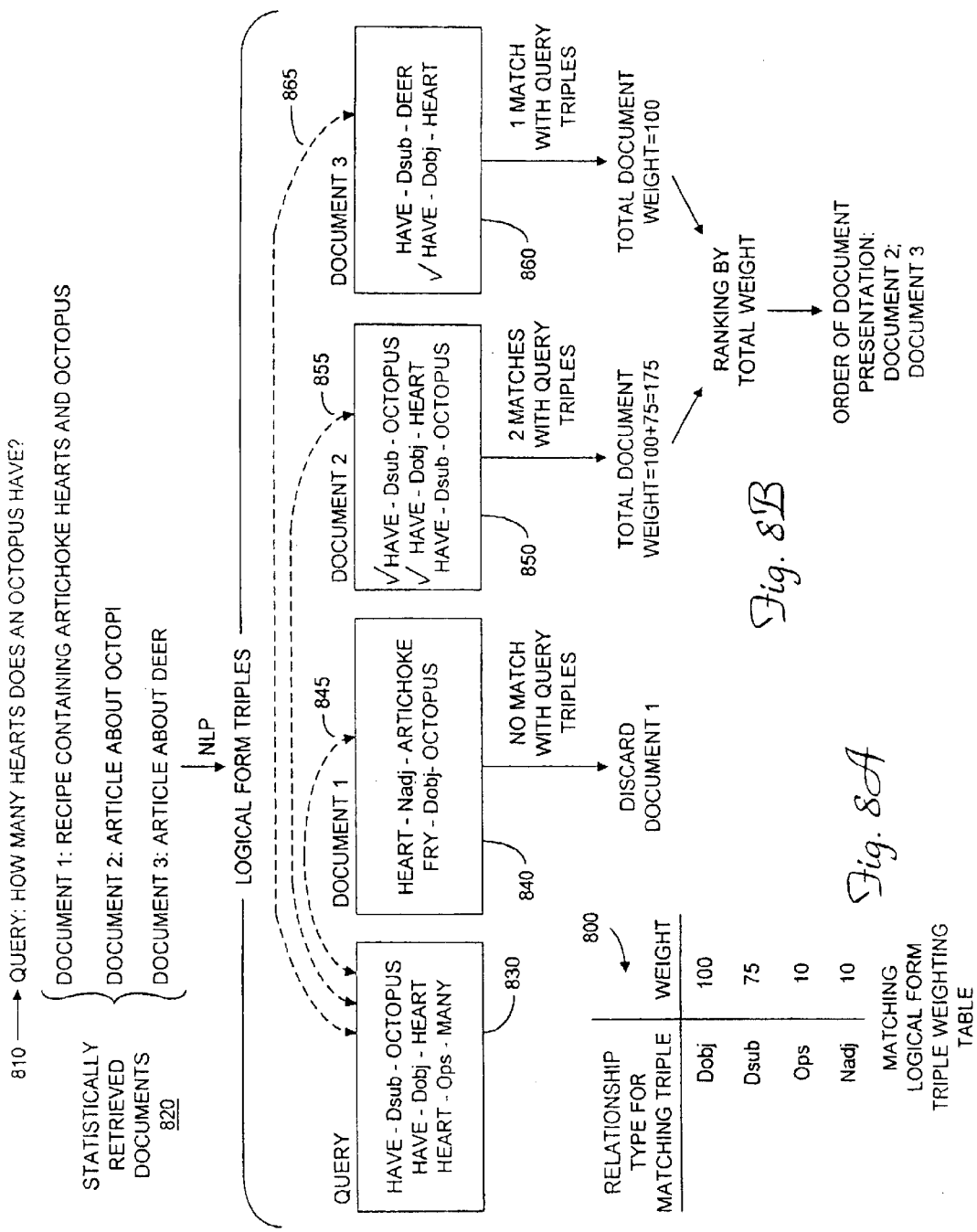
FIG. 8A depicts illustrative Matching Logical Form Triple Weighting table 800.
FIG. 8B graphically depicts logical form triple comparison; and document scoring, ranking and selection processes, in accordance with our inventive teachings, that occur within blocks 650, 660, 665 and 670, all shown in FIGS. 6A and 6B, for an illustrative query and an illustrative set of three statistically retrieved documents.

To fully appreciate the manner through which our invention illustratively compares and weights matching logical form triples, and ranks corresponding documents, consider FIG. 8B. This figure graphically depicts logical form triple comparison; document scoring, ranking and selection processes, in accordance with our inventive teachings, that occur within blocks 650, 660, 665 and 670, all shown in FIGS. 6A and 6B, for an illustrative query and an illustrative set of three retrieved documents. Assume for purposes of illustration, that a user supplied full-text query 810 to our inventive retrieval system, with the query being "How many hearts does an octopus have?". Also, assume that, in response to this query, through a statistical search engine, three documents 820 were ultimately retrieved. Of these documents, a first document (denoted Document 1) is a recipe containing artichoke hearts and octopus. A second document (denoted Document 2) is an article about octopi. A third document (denoted Document 3) is an article about deer. These three documents and the query are converted into their constituent logical form triples, the process therefor being generically represented by "NLP" (natural language processing). The resulting logical form triples for the query and Document 1, Document 2 and Document 3 are given in blocks 830, 840, 850 and 860, respectively. Once these triples have been so defined, then as symbolized by dashed lines 845, 855 and 865, the logical form triples for the query are compared, in seriatim, against the logical form triples for Document 1, Document 2 and Document 3, respectively, to ascertain whether any document contains any triple that matches any logical form triple in the query. Those documents that contain no such matching triples, as in the case of Document 1, are discarded and hence considered no further. Document 2 and Document 3, on the other hand, contain matching triples. In particular, Document 2 contains three such triples: "HAVE-Dsub-OCTOPUS", "HAVE-Dsub-HEART" illustratively associated with one sentence, and "HAVE-Dsub-OCTOPUS" associated illustratively with another sentence (these sentences not specifically shown). Of these triples, two are identical, i.e., "HAVE-Dsub-OCTOPUS". A score for a document is illustratively a numeric sum of the weights of all uniquely matching triples in that document. All duplicate matching triples for any document are ignored. An illustrative ranking of the relative weightings of the different types of relations that can occur in a triple, in descending order from their largest to smallest weightings are: first, verb-object combinations (Dobj); verb-subject combinations (Dsub); prepositions and operators (e.g. Ops), and finally modifiers (e.g. Nadj). Such a weighting scheme is given in illustrative triple weighting table 800 shown in FIG. 8A. To simplify this figure, table 800 does not include all the different relations that can arise in a logical form triple, but rather just those pertinent for the triples shown in FIG. 8B. With this metric, the particular triples in each document that contribute to its score are indicated by a check ("✓") mark. Of course, other predefined metrics for scoring documents may be used than those we have chosen, such as, e.g., multiplying rather than adding weights in order to provide enhanced document selectivity (discrimination), or summing the weights in a different predefined fashion, such as including multiple matches of the same type and/or excluding the weights of other triples than those noted above. In addition, for any document, the score may also take into account, in some fashion: the node words in the triples themselves in that document, or the frequency or semantic content of these node words in that document; the frequency or semantic content of specific node words in that document; or the frequency of specific logical forms (or paraphrases thereof) and/or of particular logical form triples as a whole in that document; as well as the length of that document.

Thus, given the illustrative scoring metric set out above and the weights listed in table 800 in FIG. 8A, the score for Document 2 is 175 and is formed by combining the weights, i.e., 100 and 75, for the first two triples associated with the first sentence in the document and indicated in block 850. The third triple in this document and associated with the second sentence thereof, and listed in this block, which already matches one of other triples existing in the document is ignored. Similarly, the score for Document 3 is 100 and is formed of the weight, here 100, for the sole matching triple, as listed in block 860, in this particular document. Based on the scores, Document 2 is ranked ahead of Document 3 with these documents being presented to the user in that order. In the event, which has not occurred here, that any two documents have the same score, then those documents are ranked in the same order provided by the conventional statistical search engine and are presented to the user in that order.

Clearly, those skilled in the art will readily appreciate that various portions of the processing used to implement our present invention can reside in a single computer or be distributed among different computers that collectively form an information retrieval system. In that regard, FIGS. 9A–9C respectively depict three different embodiments of information retrieval systems that incorporate the teachings of our present invention.

One such alternate embodiment is shown in FIG. 9A wherein all the processing resides in single local computer 910, such as a PC. In this case, computer 910 hosts a search engine and, through that engine, indexes input documents and searches a dataset (either locally situated thereat, such as on a CD-ROM or other storage medium, or accessible to that computer), in response to a user-supplied full-text query, to ultimately yield a set of retrieved documents that form an output document set. This computer also hosts our inventive processing to: analyze both the query and each such document to produce its corresponding set of logical form triples; then compare the sets of triples and select, score and rank the documents in the fashion discussed above, and finally present the results to a local user, e.g., stationed thereat or accessible thereto.

Another alternate embodiment is shown in FIG. 9B, which encompasses the specific context shown in FIG. 2, wherein the retrieval system is formed of a client PC networked to a remote server. Here, client PC 920 is connected, via network connection 925, to remote computer (server) 930. A user stationed at client PC 920 enters a full-text query which the PC, in turn, transmits over the network connection to the remote server. The client PC also analyzes the query to produce its corresponding set of logical form triples. The server hosts, e.g., a conventional statistical search engine and consequently, in response to the query, undertakes statistical retrieval to yield a set of document records. The server then returns the set of records and ultimately, either on instruction of the client or autonomously based on the capabilities of the search engine or associated software, returns each document in an output document set to the client PC. The client PC then analyzes each of the corresponding documents, in the output document set, it receives to produce a set of logical form triples therefor. The client PC then completes its processing by appropriately comparing the sets of triples and selecting, scoring and ranking the documents in the fashion discussed above, and finally presenting the results to the local user.

A further embodiment is shown in FIG. 9C. Though this embodiment employs the same physical hardware and network connections as in FIG. 9B, client PC 920 accepts a full-text query from a local user and transmits that query onward, via networked connection 925, to remote computer (server) 930. This server, instead of merely hosting a conventional search engine, also provides natural language processing in accordance with our invention. In this case, the server, rather than the client PC, would appropriately analyze the query to produce a corresponding set of logical form triples therefor. The server would also download, if necessary, each retrieved document in an output document set and then analyze each such document to produce the corresponding sets of logical form triples therefor. Thereafter, the server would appropriately compare the sets of triples for the query and documents and select, score and rank the documents in the fashion discussed above. Once this ranking has occurred, then server 930 would transmit the remaining retrieved documents in rank order, via networked connection 925, to client PC 920 for display thereat. The server could transmit these documents either on a group-by-group basis, as instructed by the user in the manner set forth above, or all in seriatim for group-by-group selection thereamong and display at the client PC.

Figure 9D:
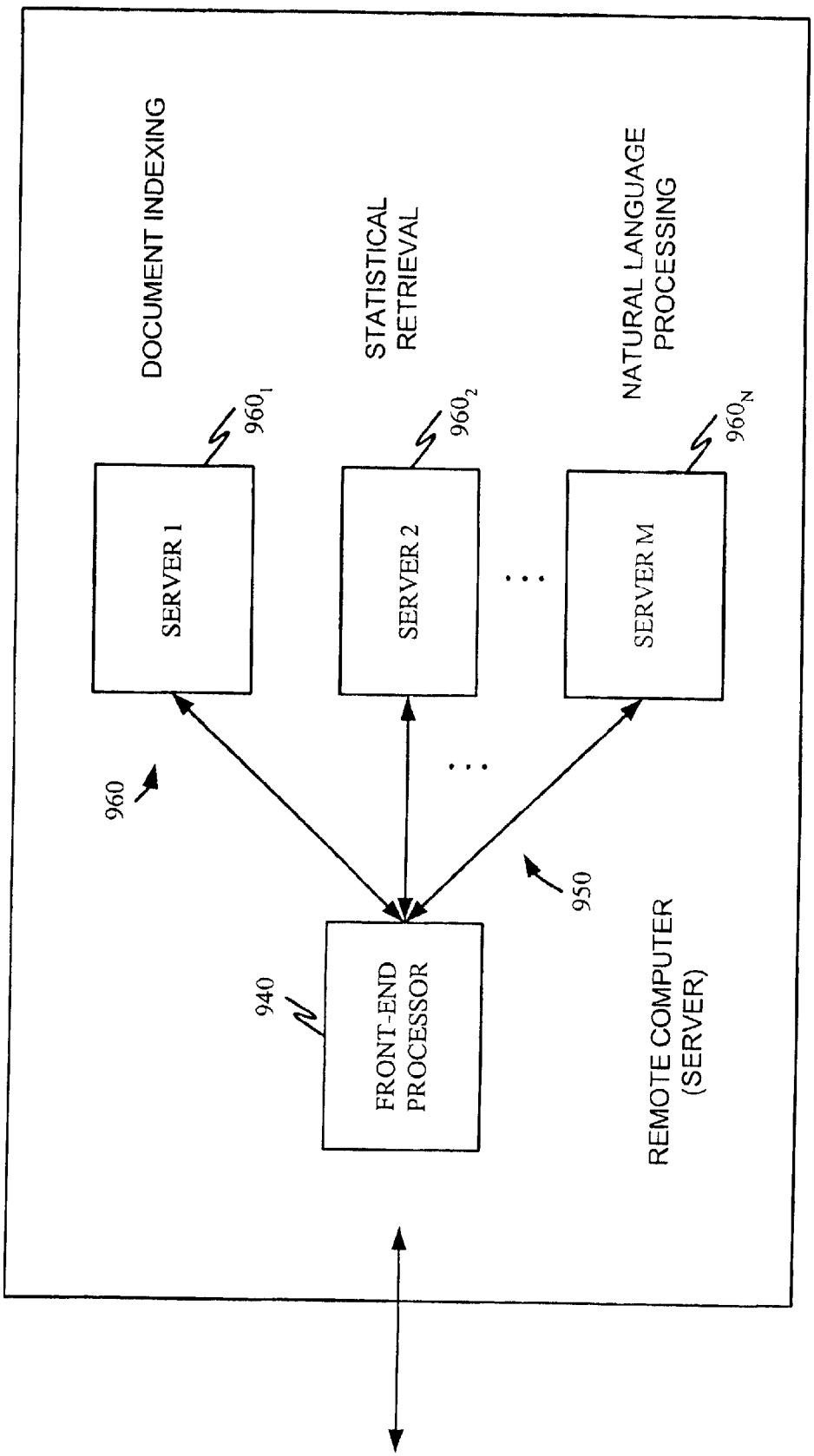
FIG. 9D depicts an alternate embodiment of remote computer (server) 930 shown in FIG. 9C for use in implementing yet another different embodiment of our present invention.

Moreover, remote computer (server) 930 need not be implemented just by a single computer that provides all the conventional retrieval, natural language and associated processing noted above, but can be a distributed processing system as shown in FIG. 9D with the processing undertaken by this server being distributed amongst individual servers therein. Here, server 930 is formed of front-end processor 940 which distributes messages, via connections 950, to a series of servers 960 (containing server 1, server 2, server n). Each of these servers implements a specific portion of our inventive process. In that regard, server 1 can be used to index input documents into dataset on a mass data store for subsequent retrieval. Server 2 can implement a search engine, such as a conventional statistical engine, for retrieving, in response to a user-supplied query routed to it by front-end processor 940, a set of document records from the mass data store. These records would be routed, from server 2, via front-end processor 940, to, e.g., server n for subsequent processing, such as downloading each corresponding document, in an output document set, from a corresponding web site or database. Front-end processor 940 would also route the query to server n. Server n would then appropriately analyze the query and each document to produce the corresponding sets of logical form triples and then appropriately compare the sets of triples and select, score and rank the documents in the fashion discussed above and return ranked documents, via front-end processor 940, to client PC 920 for ranked display thereat. Of course, the various operations used in our inventive processing could be distributed across servers 960 in any one of many other ways, whether static or dynamic, depending upon run-time and/or other conditions occurring thereat. Furthermore, server 930 could be implemented by illustratively a well-known sysplex configuration with a shared direct access storage device (DASD) accessible by all processors therein (or other similar distributed multi-processing environment) with, e.g., the database for the conventional search engine and the lexicon used for natural language processing both stored thereon.

Though we have described our invention as downloading documents in response to each retrieved document record and then locally analyzing that document, though, e.g., a client PC, to produce its corresponding logical form triples, these triples could alternatively be generated while the document is being indexed by a search engine. In that regard, as the search engine locates each new document for indexing, through, e.g. use of a web crawler, the engine could download a complete file for that document and then either immediately thereafter or later, via a batch process, preprocess the document by analyzing that document and producing its logical form triples. To complete the preprocessing, the search engine would then store these triples, as part of an indexed record for that document, in its database. Subsequently, whenever that document record is retrieved, such as in response to a search query, the triples therefor will be returned as part of the document record to the client PC for purposes of comparison and so forth. By virtue of preprocessing the documents in the search engine, a substantial amount of processing time at the client PC can be advantageously saved, thereby increasing client throughput.

Figure 10B:
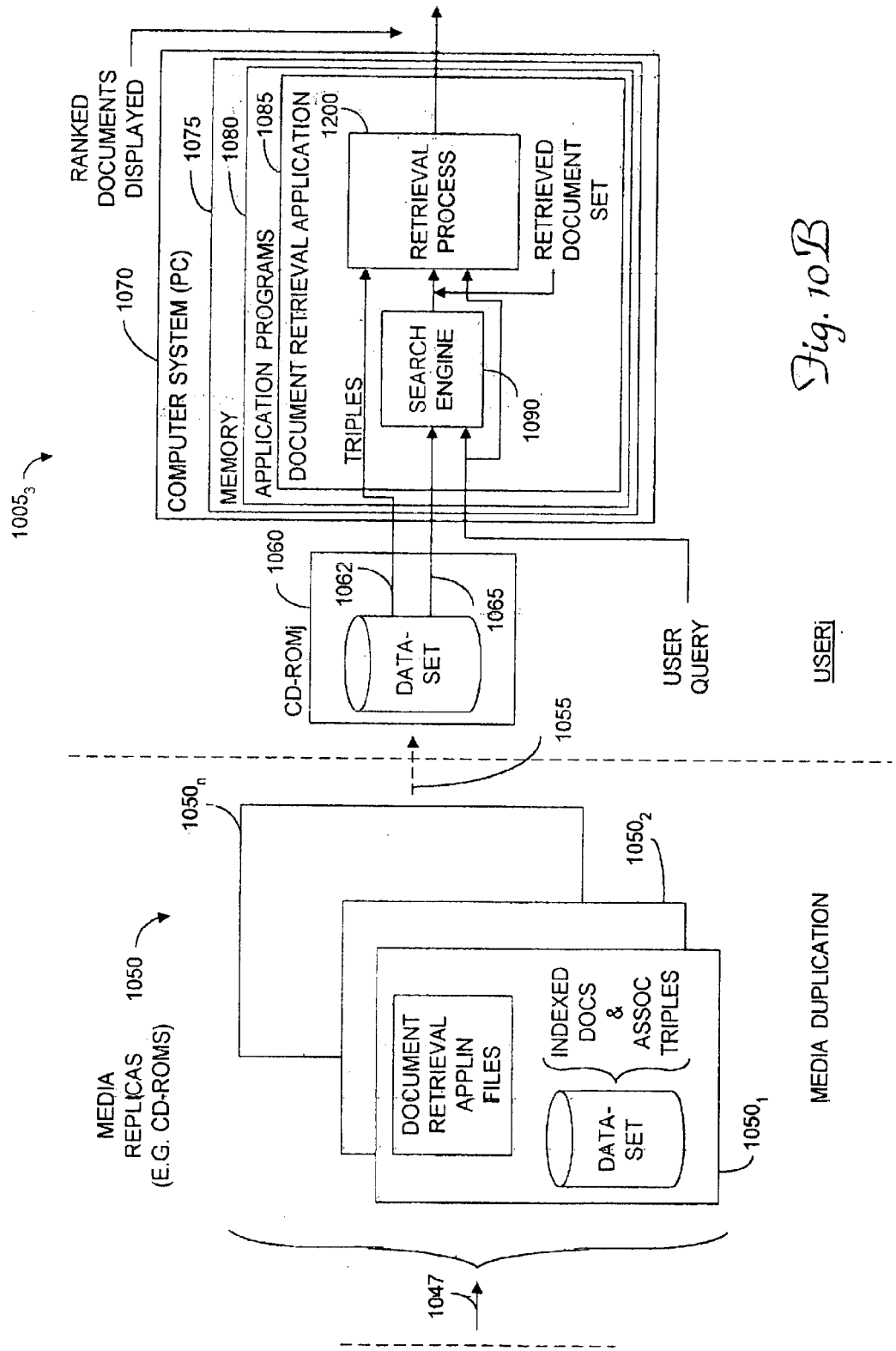

Furthermore, though we have discussed our invention in the specific context of use with an Internet-based search engine, our invention is equally applicable to use with: (a) any network accessible search engine, whether it be intranet-based or not, accessible through a dedicated network facility or otherwise; (b) a localized search engine operative with its own stored dataset, such as a CD-ROM based data retrieval application typified by an encyclopedia, almanac or other self-contained stand-alone dataset; and/or (c) any combination thereof. The present invention can be used in any other suitable application as well. With the above in mind, FIGS. 10A and 10B collectively depict yet another embodiment of our present invention which generates logical form triples through document preprocessing with the resulting triples, document records and documents themselves being collectively stored, as a self-contained stand-alone dataset, on common storage media, such as one or more CD-ROMs or other transportable mass media (typified by removable hard disk, tape, or magneto-optical or large capacity magnetic or electronic storage devices), for ready distribution to end-users. The correct depiction of the drawing sheets for these figures is shown in FIG. 10. By collectively placing on, common media, the retrieval application itself and the accompanying dataset which is to be searched, a stand-alone data retrieval applications results; hence, eliminating a need for a network connection to a remote server to retrieve documents.

As shown, this embodiment is comprised of essentially three components: document indexing component $1005_1$, duplication component $1005_2$ and user component $1005_3$. Component $1005_1$ gathers documents for indexing into a dataset, illustratively dataset 1030, that, in turn, will form the document repository for a self-contained document retrieval application, such as, e.g., an encyclopedia, almanac, specialized library (such as a decisional law reporter), journal collection or the like. With the rapidly diminishing cost associated with duplicating CD-ROMs and other forms of media that have substantial storage capacity, this embodiment is particularly attractive to cost-effectively disseminate large collections of documents, together with the ability to accurately search through the collection, to a wide user community.

Figure 11:
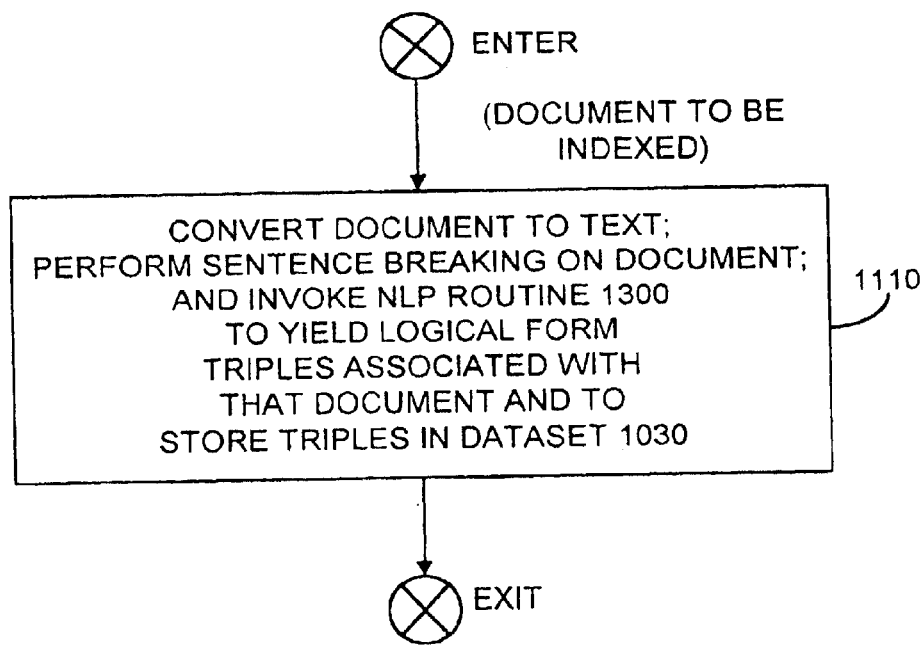
FIG. 11 depicts Triple Generation process 1100 that is performed by Document Indexing engine 1015 shown in FIGS. 10A and 10B.

In any event, incoming documents to be indexed into the dataset are gathered from any number of a wide variety of sources and applied, in seriatim, to computer 1010. This computer implements, through appropriate software stored within memory 1015, a document indexing engine which establishes a record within dataset 1030 for each such document and stores information into that record for the document, and also establishes an appropriate stored entry, in the dataset, containing a copy of the document itself. Engine 1015 executes triple generation process 1100. This process, to be described in detail below in conjunction with FIG. 11, is separately executed for each document being indexed. In essence, this process, in essentially the same manner as discussed above for block 640 shown in FIGS. 6A and 6B, analyzes the textual phrases in the document and, through so doing, constructs and stores a corresponding set of logical form triples, for that document, within dataset 1030. Inasmuch as all other processes executed by indexing engine 1010, shown in FIGS. 10A and 10B, to index a document, including generating an appropriate record therefor, are all irrelevant to the present invention, we will not address them in any detail. Suffice it to say, that once the set of triples is generated through process 1100, engine 1015 stores this set onto dataset 1030 along with a copy of the document itself and the document record created therefor.

Hence, dataset 1030, at the conclusion of all indexing operations, not only stores a complete copy of every document indexed therein and a record therefor, but also stores a set of logical form triples for that document.

Once all the desired documents are appropriately indexed, dataset 1030, being viewed as a "Master Dataset" is itself then duplicated through duplication component $1005_2$. Within component $1005_2$, conventional media duplication system 1040 repetitively writes a copy of the contents of the master dataset, as supplied over line 1035, along with a copy of appropriate files for the retrieval software including a retrieval process and a user installation program, as supplied over line 1043, onto common storage media, such one or more CD-ROMs, to collectively form the stand-alone document retrieval application. Through system 1040, a series 1050 of media replicas 1050 is produced having individual replicas $1050_1$, $1050_2$, $1050_n$. All the replicas are identical and contain, as specifically shown for replica $1050_1$, a copy of the document retrieval application files, as supplied over line 1043, and a copy of dataset 1030, as supplied over line 1035. Depending on the size and organization of the dataset, each replica may extend over one or more separate media, e.g. separate CD-ROMs. Subsequently, the replicas are distributed, typically by a purchased license, throughout a user community, as symbolized by dashed line 1055. Once a user, e.g. Userj, obtains a replica, such as CD-ROM$_j$ (also denoted as CD-ROM 1060), as depicted in user component $1005_3$, the user can execute the document retrieval application, including our present invention, through computer system 1070 (such as a PC having a substantially, if not identical architecture, to client PC 300 shown in FIG. 3), against the dataset stored in CD-ROM$_j$ to retrieve desired documents therefrom. In particular, after the user obtains CD-ROM$_j$, the user inserts the CD-ROM into PC 1070 and proceeds to execute the installation program stored on the CD-ROM in order to create and install a copy of the document retrieval application files into memory 1075, usually a predefined directory within a hard disk, of the PC, thereby establishing document retrieval application 1085 on the PC. This application contains search engine 1090 and retrieval process 1200. Once installation is complete and application 1085 is invoked, the user can then search through the dataset on CD-ROM$_j$ by providing an appropriate full-text query to the application. In response to the query, the search engine retrieves, from the dataset, a document set including the records for those documents and the stored logical form triples for each such document. The query is also applied to retrieval process 1200. This process, very similar to that of retrieval process 600 discussed above in conjunction with FIGS. 6A and 6B, analyzes the query and constructs the logical form triples therefor. Thereafter, process 1200, shown in FIGS. 10A and 10B, compares the logical form triples for each of the retrieved documents, specifically the records therefor, in the set against the triples for the query. Based on the occurrence of matching triples therebetween and their weights, process 1200 then scores, in the manner described in detail above, each of the documents that exhibits at least one matching triple, ranks these documents in terms of descending score, and finally visually presents the user with a small group of the document records, typically 5–20 or less, that have the highest rankings. The user, upon reviewing these records, can then instruct the document retrieval application to retrieve and display an entire copy of any of the associated documents that appears to be interest. Once the user has reviewed a first group of document records for a first group of retrieved documents, the user can then request a next group of document records having the next highest rankings, and so forth until all the retrieved document records have been so reviewed. Though application 1085 initially returns ranked document records in response to a query, this application could alternatively return ranked copies of the documents themselves in response to the query.

FIG. 11 depicts Triple Generation process 1100 that is performed by Document Indexing engine 1015 shown in FIGS. 10A and 10B. As discussed above, process 1100 preprocesses a document to be indexed by analyzing the textual phrases in that document and, through so doing, constructing and storing a corresponding set of logical form triples, for that document, within dataset 1030. In particular, upon entry into process 1100, block 1110 is executed. This block first extracts all the text from that document, including any text situated within HTML tags associated with that document. Thereafter, to facilitate natural language processing which operates on a single sentence at a time, the text for each document is broken into a text file, through a conventional sentence breaker, in which each sentence (or question) occupies a separate line in the file. Thereafter, block 1110 invokes NLP routine 1300 (which will be discussed in detail below in conjunction with FIG. 13A), separately for each line of text in that document, to analyze this document and construct and locally store a corresponding set of logical form triples for that line and stored the set within dataset 1030. Once these operations have been completed, execution exits from block 1110 and process 1100.

Figure 12A:
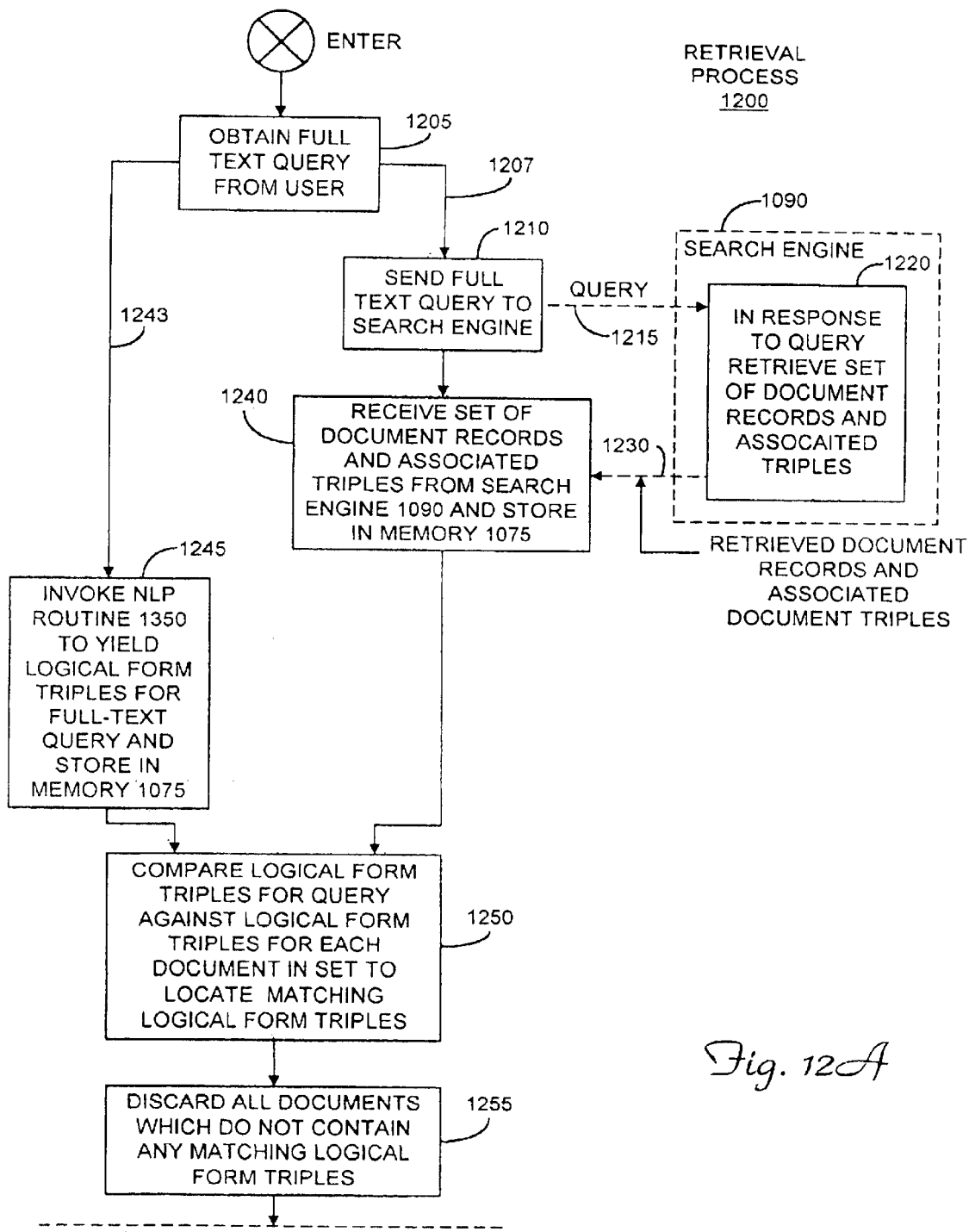

A flowchart of our inventive retrieval process 1200, as used in the specific embodiment of our invention shown in FIGS. 10A and 10B is collectively depicted in FIGS. 12A and 12B; for which the correct alignment of the drawing sheets for these figures is shown in FIG. 12. In contrast with Retrieval process 600 (shown in FIGS. 6A and 6B and discussed in detail above), all the operations shown in FIGS. 12A and 12B are performed on a common computer system, here PC 1070 (see FIGS. 10A and 10B). To simplify understanding, the reader should also simultaneously refer to FIGS. 10A and 10B throughout the following discussion.

Upon entry into process 1200, execution proceeds first to block 1205. This block, when executed, prompts a user to enter a full-text query. Once this query is obtained, execution splits and proceeds, via path 1207, to block 1210 and, via path 1243, to path 1245. Block 1245, when performed, invokes NLP routine 1350 to analyze the query and construct and locally store its corresponding set of logical form triples within memory 1075. Block 1210, when performed, transmits, as symbolized by dashed line 1215, the full-text query to search engine 1090. At this point, the search engine performs block 1220 to retrieve both a set of document records in response to the query and the associated logical form triples associated with each such record. Once this set and the associated logical form triples are retrieved, both are then applied, as symbolized by dashed line 1230, back to process 1200 and specifically to block 1240 therein. Block 1240 merely receives this information from search engine 1090 and stores it within memory 1075 for subsequent use. Though the operations in block 1245 have been discussed as being performed essentially in parallel with those in blocks 1210, 1090 and 1220, the operations in block 1245, based on actual implementation considerations, could be performed serially either before or after the operations in blocks 1210, 1090 or 1220.

Once the sets of logical form triples have been stored in memory 1075 for both the query and for each of the retrieved document records, block 1250 is performed. This block compares, in the manner described in detail above, each of the logical form triples in the query against each of the logical form triples for each of the retrieved document records to locate a match between any triple in the query and any triple in any of the corresponding documents. Once block 1250 completes, block 1255 is performed to discard all retrieved records for documents that do not exhibit a matching triple, i.e., having no triple that matches any triple in the query. Thereafter, block 1260 is performed. Through block 1260, all remaining document records are assigned a score as defined above and based on the relation type(s) of matching triples and their weights, that exist for each of the corresponding documents. Once the document records are so weighted, block 1265 is performed to rank order the records in order of descending score. Finally, block 1270 is performed to display the records in rank order, typically in terms of a small predefined group of document records, typically five or ten, that exhibit the highest scores. Thereafter, the user, can, for example, by appropriately "clicking" his(her) mouse on a corresponding button displayed by computer system 1070, have that system display the next group of ranked document records, and so forth until the user has sufficiently examined all the ranked document records (and has accessed and examined any document of interest therein) in succession, at which point process 1200 is completed with execution then exiting therefrom.

FIG. 13A depicts a flowchart of NLP routine 1300 which is executed within Triple Generation process 1100 shown in FIG. 11. As stated above, NLP routine 1300 analyzes an incoming document to be indexed, specifically a single line of text therefor, and constructs and locally stores a corresponding set of logical form triples for that document within dataset 1030, shown in FIGS. 10A and 10B. Routine 1300 operates in essentially the same fashion as does NLP routine 700 shown in FIG. 7 and discussed in detail above.

In particular, upon entry into routine 1300, block 1310 is first executed to process a line of input text to yield a logical form graph, such as illustrative graph 515 shown in FIG. 5A. Thereafter, as shown in FIG. 13A, block 1320 is performed to extract (read) a set of corresponding logical form triples from the graph. Once this occurs, block 1330 is executed to generate each such logical form triple as a separate and distinct formatted text string. Finally, block 1340 is executed to store, in dataset 1030, the line of input text and, as a series of formatted text strings, the set of logical form triples for that line. Once this set has been completely stored, execution exits from block 1300. Alternatively, if in lieu of logical form triples, a different form, e.g. a logical form graph or sub-graph thereof, is to be used in conjunction with our invention, then blocks 1320 and 1330 would be readily modified to generate that particular form as the formatted string, with block 1340 storing that form in lieu of logical form triples into the dataset.

FIG. 13B depicts a flowchart of NLP routine 1350 which is executed within Retrieval process 1200. As stated above, NLP routine 1350 analyzes a query supplied by User$_j$ to document retrieval application 1085 (shown in FIGS. 10A and 10B) and constructs and locally stores a corresponding set of logical form triples therefor and within memory 1075. The only difference in operation between routine 1350 and routine 1300, discussed in detail above in conjunction with FIG. 13A, lies in the location where the corresponding triples are stored, i.e. in dataset 1030 through execution of block 1340 in NLP routine 1300 and in memory 1075 through execution of block 1390 for NLP routine 1350. Inasmuch as the operations performed by the other blocks, specifically blocks 1360, 1370 and 1380, of routine 1350 are substantially the same as those performed by blocks 1310, 1320 and 1330, respectively, in routine 1300, we will dispense with discussing the former blocks in any detail.

To experimentally test the performance of our inventive retrieval process, as generally described above in conjunction with FIG. 1, we used the ALTA VISTA search engine as the search engine in our retrieval system. This engine, which is publicly accessible on the Internet, is a conventional statistical search engine that ostensibly has over 31 million indexed web pages therein and is widely used (to the order of approximately and currently 28 million hits per day). We implemented our inventive retrieval process 600 on a standard Pentium 90 MHz PC using various natural language processing components, including a dictionary file, that are contained within a grammar checker that forms a portion of MICROSOFT OFFICE 97 program suite ("OFFICE" and "OFFICE 97" are trademarks of Microsoft Corporation of Redmond, Wash.). We used an on-line pipelined processing model, i.e., documents were gathered and processed online in a pipelined fashion while a user waited for ensuing results. Through this particular PC, approximately one-third to one-half second were required to generate logical form triples for each sentence.

Volunteers were asked to generate full-text queries for submission to the search engine. A total of 121 widely divergent queries were generated, with the following ones being representative: "Why was the Celtic civilization so easily conquered by the Romans?", "Why do antibiotics work on colds but not on viruses?", "Who is the governor of Washington?", "Where does the Nile cross the equator?" and "When did they start vaccinating for small pox?". We submitted each of these 121 queries to the ALTA VISTA search engine and obtained, where available, the top 30 documents that were returned in response to each query. In those instances where fewer than 30 documents were returned for some of the queries, we used all the documents that were returned. Cumulatively, for all 121 queries, we obtained 3361 documents (i.e., "raw" documents).

Each of the 3361 documents and the 121 queries were analyzed through our inventive process to produce corresponding sets of logical form triples. The sets were appropriately compared, with the resulting documents being selected, scored and ranked in the fashion discussed above.

All 3361 documents were manually and separately evaluated as to their relevance to the corresponding query for which the document was retrieved. To evaluate relevance, we utilized a human evaluator, who was unfamiliar with our specific experimental goals, to manually and subjectively rank each of these 3361 documents for its relevance, as being "optimal", "relevant" or "irrelevant", to its corresponding query. An optimal document was viewed as one which contained an explicit answer to the corresponding query. A relevant document was one that did not contain an explicit answer to the query but was nevertheless relevant thereto. An irrelevant document was one that was not a useful response to the query, e.g. a document that was irrelevant to the query, in a language other than English or could not be retrieved from a corresponding URL provided by the ALTA VISTA engine (i.e., a "cobweb" link). To increase the accuracy of the evaluation, a second human evaluator examined a sub-set of these 3361 documents, specifically those documents that exhibited at least one logical form triple that matched a logical form triple in its corresponding query (431 out of the 3361 documents), and those documents previously ranked as relevant or optimal but which did not have any matching logical form triples (102 out of the 3361 documents). Any disagreements in these rankings for a document were reviewed by a third human evaluator who served as a "tie-breaker".

As a result of this experiment, we observed that, across all the documents involved, our inventive retrieval system yielded improvements, over that of the raw documents returned by the ALTA VISTA search engine, on the order of approximately 200% in overall precision (i.e., of all documents selected) from approximately 16% to approximately 47%, and approximately 100% of precision within the top five documents from approximately 26% to approximately 51%. In addition, use of our inventive system increased the precision of the first document returned as being optimal by approximately 113% from approximately 17% to approximately 35%, over that for the raw documents.

Though we have specifically described our invention in the context of use with a statistical search engine, our invention is not so limited. In that regard, in the information retrieval application, our invention can be used to process retrieved documents obtained through substantially any type of search engine in order to improve the precision of that engine.

Rather than using fixed weights for each different attribute in a logical form triple, these weights can dynamically vary and, in fact, can be made adaptive. To accomplish this, a learning mechanism, such as, e.g., a Bayesian or neural network, could be appropriately incorporated into our inventive process to vary the numeric weight for each different logical form triple to an optimal value based upon learned experiences.

Though our inventive process, as discussed above in one illustrative embodiment, required logical form triples to exactly match, the criteria for determining a match, for purposes of identifying sufficiently similar semantic content across triples, can be relaxed to encompass paraphrases as matching. A paraphrase may be either lexical or structural or can include generating abstract logical forms, as described below. An example of a lexical paraphrase would be either a hypernym or a synonym. A structural paraphrase is exemplified by use of either a noun appositive or a relative clause. For example, noun appositive constructions such as "the president, Bill Clinton" should be viewed as matching relative clause constructions such as "Bill Clinton, who is president". At a semantic level, fine-grained judgments can be made as to how semantically similar two words are to one another, thereby sanctioning matches between a query "Where is coffee grown?" and sentences in a corpus such as "Coffee is frequently farmed in tropical mountainous regions." In addition, a procedure for determining whether a match exists could be modified according to a type of query being asked. For example, if a query asks where something is, then the procedure should insist that a "Location" attribute be present in any triple associated with the sentence being tested in order for it to be viewed as matching against the query. Hence, logical form triples "matches" are generically defined to encompass not only identical matches but also those that result from all such relaxed, judgmental and modified matching conditions.

Moreover, our invention can be readily combined with other processing techniques which center on retrieving non-textual information, e.g. graphics, tables, video or other, to improve overall precision. Generally speaking, non-textual content in a document is frequently accompanied in that document by a linguistic (textual) description, such as, e.g., a figure legend or short explanation. Hence, use of our inventive process, specifically the natural language components thereof, can be used to analyze and process the linguistic description that often accompanies the non-textual content. Documents could be retrieved using our inventive natural language processing technique first to locate a set of documents that exhibit linguistic content semantically relevant to a query and then processing this set of documents with respect to their non-textual content to locate a document(s) that has relevant textual and non-textual content. Alternatively, document retrieval could occur first with respect to non-textual content to retrieve a set of documents; followed by processing that set of documents, through our inventive technique, with respect to their linguistic content to locate a relevant document(s).

FIG. 14 is a simplified functional diagram of an information retrieval system 1480 in accordance with one aspect of the present invention. System 1480 includes retrieval engine 1482, search engine 1484 and statistical data store 1486. It should be noted that the entire system 1480, or part of system 1480, can be implemented in the environment illustrated in FIG. 3. For example, retrieval engine 1482 and search engine 84 can simply be implemented as computer readable instructions stored in memory 322 which are executed by CPU 321 in order to perform the desired functions. Alternatively, retrieval engine 1482 and search engine 84 can be provided on any type of computer readable medium, such as those described with respect to FIG. 3. In addition, retrieval engine 1482 and search engine 1484 can be provided in a distributed processing environment and carried out in separate processors. Further, statistical data store 1486 can also be stored in the memory components discussed with respect to FIG. 3, it can be stored on a memory located in wide area network 352, or it can be stored in, for example, memory 350 accessible over local area network 351. In another illustrative embodiment, store 1486 can be located in a portion of memory 322 and can be accessed by the operating system in computer 320.

In any case, a textual input (or query) is provided to retrieval engine 1482 through any suitable input mechanism, such as keyboard 340, mouse 342, etc. Retrieval engine 1482 performs a number of functions based on the query. In one preferred embodiment, retrieval engine 1482 formulates a Boolean query based on the textual input, and provides the Boolean query to search engine 1484.

Search engine 1484, in one illustrative embodiment, is a search engine provided under the commercial designation Alta Vista by Digital Equipment Corporation of Maynard, Mass. The Alta Vista search engine is a conventional internet search engine. In such an embodiment, retrieval engine 1482 is connected to search engine 1484 by an appropriate internet connection. Of course, other search engines can be used as well.

In an illustrative embodiment, search engine 1484 is a statistical search engine which has access to statistical data store 1486. Such a statistical search engine typically incorporates statistical processing into the search methodologies used to search data store 1486.

Data store 1486 may typically contain a data set of document records indexed by search engine 1484. Each such record, may, for example, contain a web address at which a corresponding document can be accessed by a web browser, predefined content words which appear in that document, possibly a short summary of the document, and a description of the document as provided in its hypertext marked-up language (HTML) description fields. In addition, statistical data store 1486 may also include data indicative of logical forms computed for the documents indexed therein. In one illustrative embodiment, the logical forms associated with an index entry correspond to the language originally used in the document indexed. In another illustrative embodiment, and as will be described in greater detail below, the logical forms are modified to include paraphrase logical forms and to suppress high frequency logical forms.

Statistical search engine 1484 typically calculates numeric measures for each document record retrieved from statistical data store 1486. The numerical measure is based on the query provided to search engine 1484. Such numeric measures may include, for example, term frequency * inverse document frequency (tf*idf).

In any case, search engine 1484 returns to retrieval engine 1482 either the document records identified, or the documents themselves, ranked in order of the statistical measure calculated for each document record. In one illustrative embodiment, retrieval engine 1482 subjects the return documents or records to additional natural language processing in order to refine the ranking of the documents or records. The documents or records are then provided to the user, as an output document set, according to the refined ranking.

Figure 15:
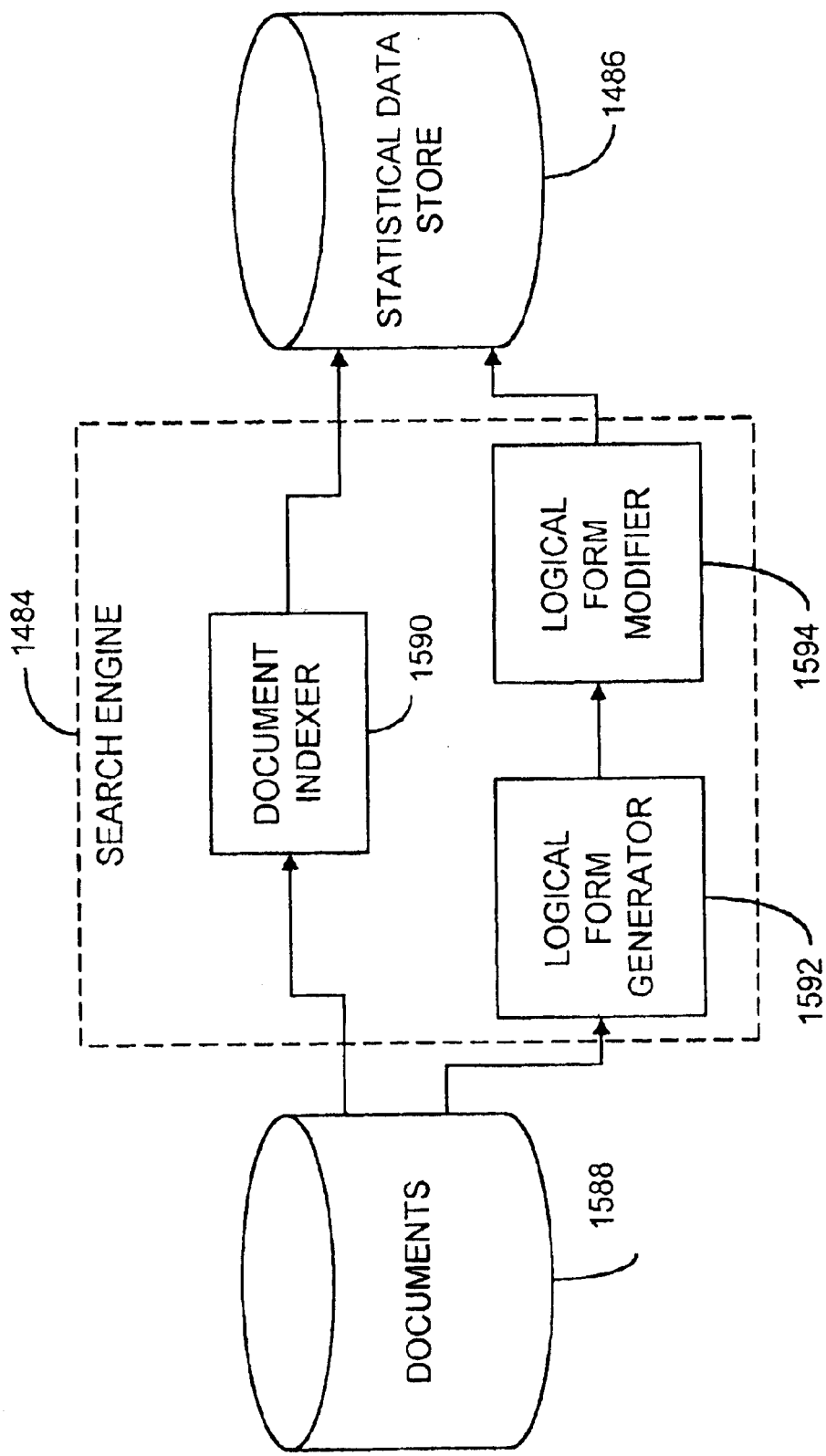
FIG. 15 is a functional block diagram illustrating indexing of documents in accordance with one aspect of the present invention.

FIG. 15 is a more detailed functional block diagram of search engine 1484, illustrating how statistical data store 1486 is created in accordance with one illustrative embodiment of the present invention. FIG. 15 illustrates documents 1588 stored on any suitable storage device. Such a storage device may be computers in a distributed computing environment, storage accessed by an operating system in computer 320, computers accessible over a wide area network (such as the internet), a library database, or any other suitable location at which documents are stored. The documents 1588 are accessible by search engine 1484, typically through a web crawler component referred to herein as document indexer 1590. Document indexer 1590 accesses documents 1588 and indexes them in a known fashion, generating the records associated with each of the documents accessed.

Search engine 1484 also includes a logical form generator 1592 and a logical form modifier 1594. Logical form generator 1592 also accesses the documents and creates logical forms corresponding to each of the documents accessed.

Logical form generator 1592 generates logical forms based on input text in a manner described in greater detail in co-pending U.S. patent application Ser. No. 08/674,610 entitled "METHOD AND SYSTEM FOR COMPUTING SEMANTIC LOGICAL FORMS FROM SYNTAX TREES", which is incorporated above by reference. Briefly, semantic analysis generates a logical form graph that describes the meaning of the textual input. The logical form graph includes nodes and links wherein the links are labeled to indicate the relationship between a pair of nodes. Logical form graphs represent a more abstract level of analysis than, for example, syntax parse trees, because the analysis normalizes many syntactic or morphological variations.

Logical form modifier 1594 receives the logical forms generated by logical form generator 1592 and modifies the logical forms. Modifier 1594 illustratively creates a set of paraphrased logical forms based on the original logical forms and suppresses a predetermined class of logical forms (such as high frequency logical forms) which are not helpful in distinguishing among various documents.

The records created by document indexer 1590, along with the set of modified logical forms, are illustratively provided to statistical data store 1486 where they are stored for later access by search engine 1484 in response to a query provided through retrieval engine 1482. The logical form modifier 1494 is described in greater detail below.

Figure 16:
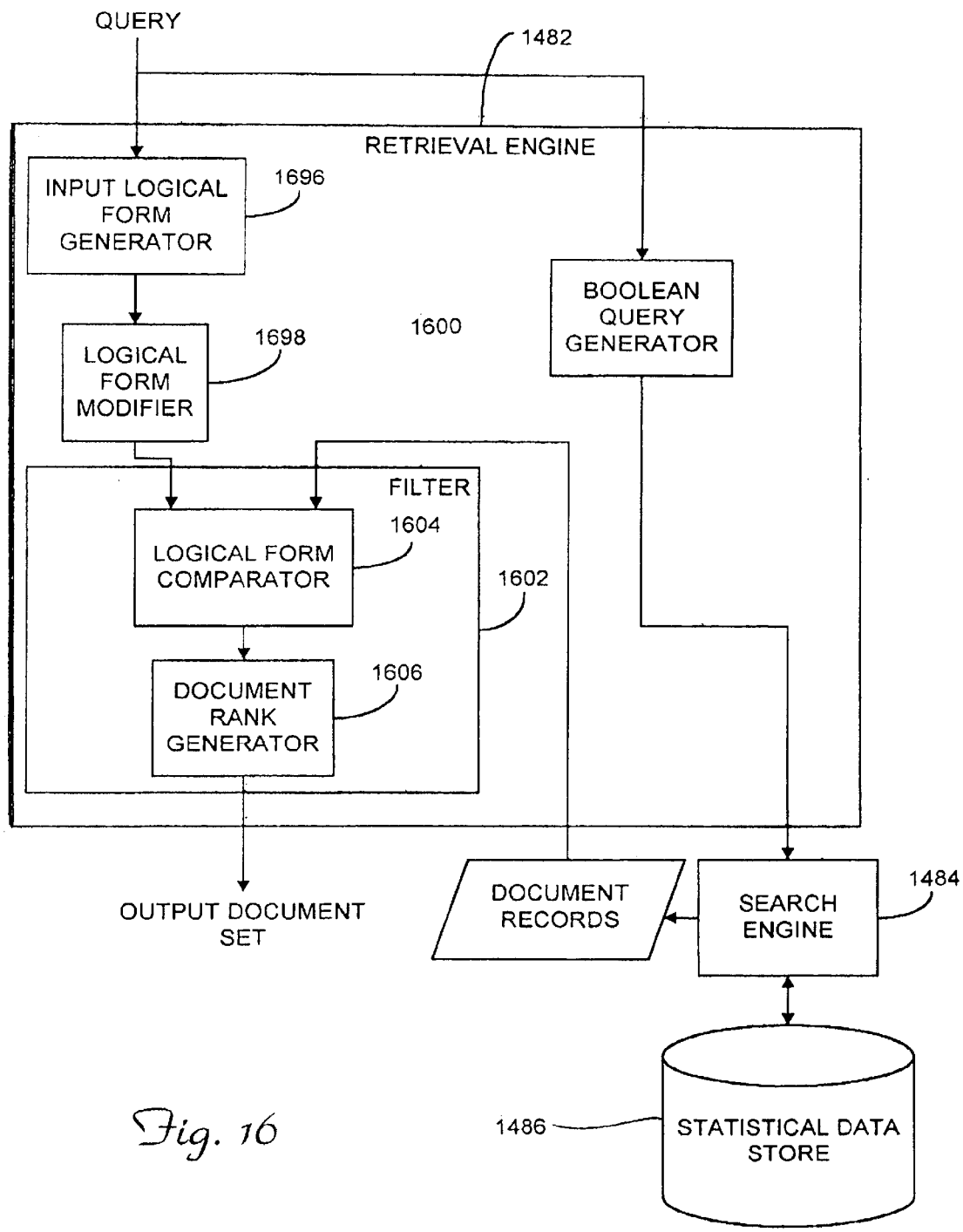
FIG. 16 is a more detailed block diagram of a retrieval engine in accordance with one aspect of the present invention.

FIG. 16 is a more detailed block diagram of retrieval engine 1482. In an illustrative embodiment, retrieval engine 1482 includes input logical form generator 1696, logical form modifier 1698, Boolean query generator 1600 and filter 1602. Filter 1602, in turn, includes logical form comparator 1604 and document rank generator 1606.

The user input query is provided to Boolean query generator 1600. Boolean query generator 1600 generates a Boolean query based on the user input query in the same manner as in a conventional information retrieval system. The Boolean query is provided to search engine 1484 which executes the query against statistical data store 1486. Statistical data store 1486, in response, returns document records (including the modified set of logical forms) to search engine 1484 which, in turn, provides them to filter 1602 in retrieval engine 1482.

The query is also provided to input logical form generator 1596. Generator 1596 generates one or more logical forms based on the original words, and their relation to one another, in the query. The logical forms are generated in the same fashion as described with respect to logical form generator 1592 in FIG. 15.

The original logical forms are provided to logical form modifier 1698 which modifies the logical forms to illustratively include a set of paraphrased logical forms, and to suppress high frequency logical forms. This modified set of logical forms is also provided to logical form comparator 1604 in filter 1602.

Logical form comparator 1604 compares the modified set of logical forms based on the query with the modified set of logical forms based on the documents retrieved from data store 1486. If any of the modified set of logical forms based on the query match those based on the documents, logical form comparator 1604 assigns a weight to the particular document containing the matched logical form. The weight is based on the number and type of matches associated with each document. If any document does not contain any matches, the document can either be discarded and not provided to the user, or provided to the user along with an indication that the documents may be less likely to be relevant to the query.

The records of documents containing matches, along with the weights assigned by logical form comparator 1604, are provided to document rank generator 1606. Document rank generator 1606 ranks the documents based on the weights assigned by logical form comparator 1604 and provides a ranked output to the user as the output document set.

Figure 17:
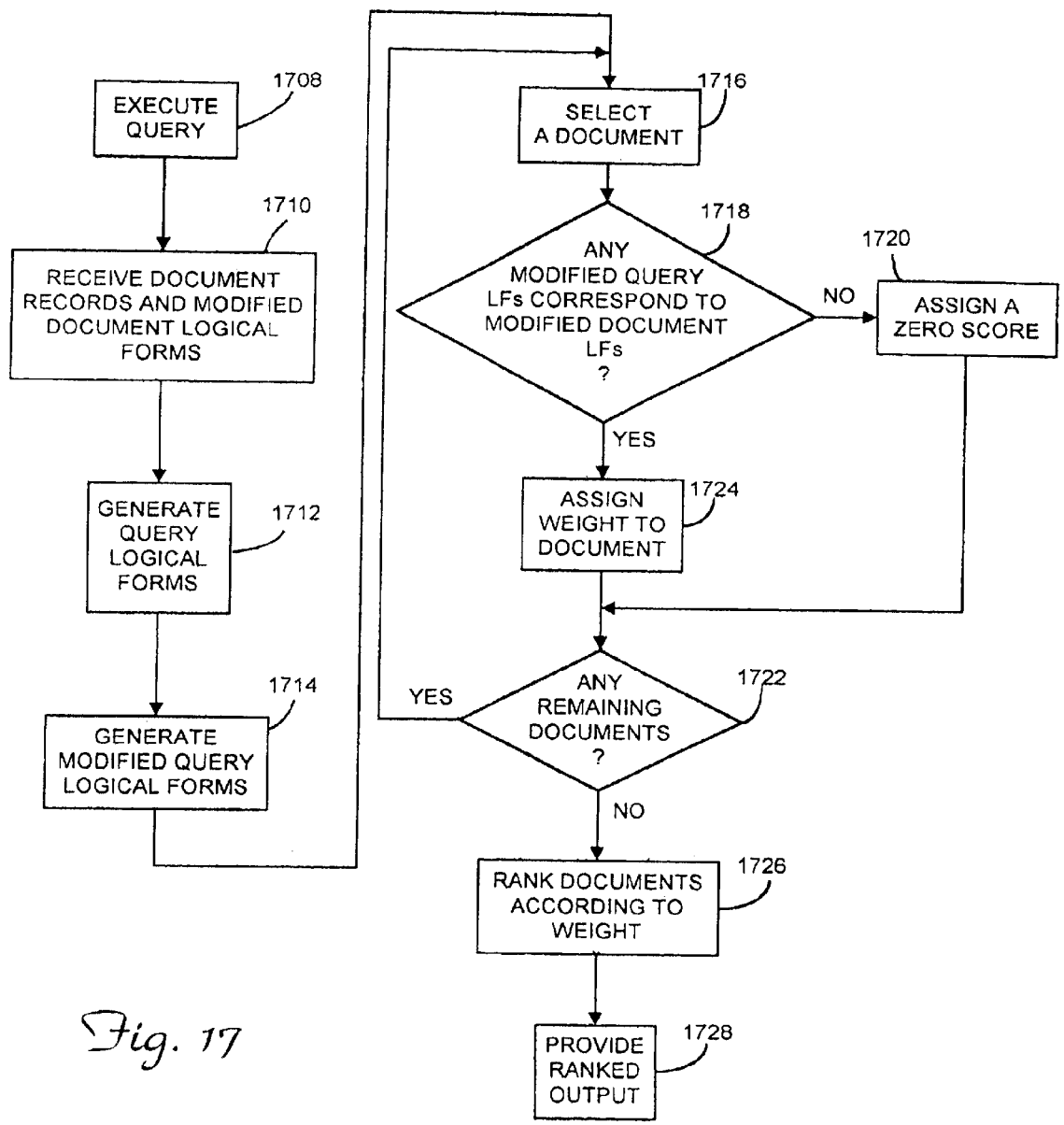
FIG. 17 is a flow diagram illustrating operation of the system shown in FIG. 16.

FIG. 17 is a flow diagram illustrating, in more detail, the operation of the system illustrated in FIG. 16. The input query is first executed against statistical data store 1486 and the document records and the modified logical forms associated with those document records are provided to filter 1602. This is indicated by blocks 1708 and 1710. Generator 1696 then generates logical forms based on the original content of the query. This is indicated by block 1712. The logical forms based on the query are then modified by logical form modifier 1698. This is indicated by block 1714.

Filter 1602 then selects a first of the document records provided by search engine 1484 in response to the query. This is indicated by block 1716. Logical form comparator 1604 determines whether any of the modified query logical forms correspond to the modified document logical forms. If not, the document is assigned a zero score and filter 1602 determines whether any additional documents need to be compared. This is indicated by blocks 1718, 1720 and 1722.

If, however, any of the modified query logical forms matches any of the modified document logical forms, then the document being analyzed is assigned a weight by logical form comparator 1604. This is indicated by block 1724. Again, filter 1602 determines whether any additional documents need to be compared, as illustrated by block 1722.

When no more documents need to be compared, document rank generator 1606 ranks the documents according to the weight assigned by logical form generator 1604. The ranked output is then provided to the user. This is indicated by blocks 1726 and 1728.

Figure 18:
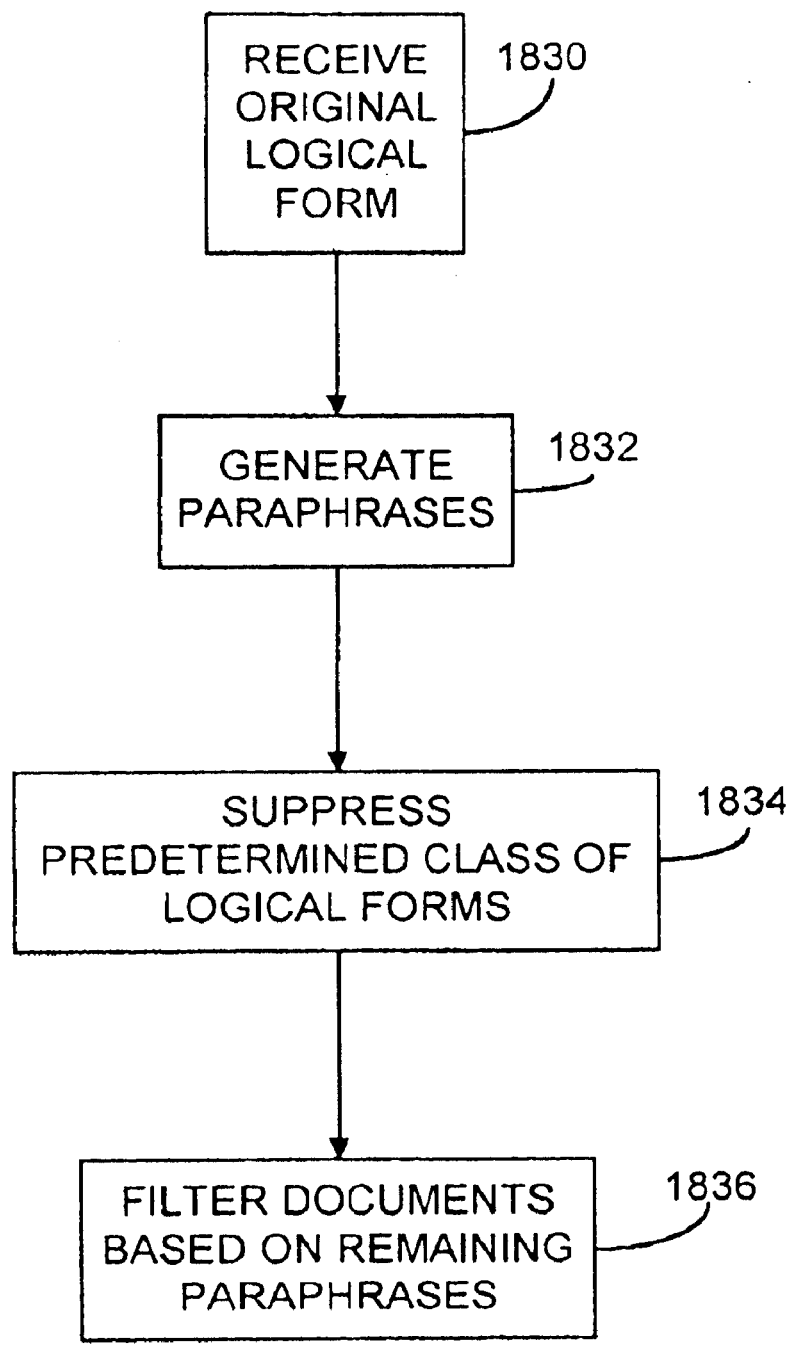
FIG. 18 is a flow diagram illustrating natural language processor modification of logical forms in accordance with one aspect of the present invention.

FIG. 18 is a flow diagram illustrating the operation of logical form modifier 1594 shown in FIG. 15 and logical form modifier 1698 shown in FIG. 16. It will be understood that the present invention contemplates using modified logical forms, as discussed in greater detail below, on either the query side, or the data side, or both. For purposes of the present discussion, logical form modifiers are shown on both the query side and the data side.

In any case, the logical form modifier first receives the original logical form generated based on either the query or the documents being analyzed. This is indicated by block 1830. The logical form modifier then generates paraphrases of the original logical forms. The paraphrases can be formed in any number of ways, several of which are described below. Generation of the paraphrase logical forms is indicated by block 1832.

The logical form modifier then suppresses a predetermined class of logical forms (which can also be a wide variety of logical forms), a number of which are discussed below. This suppression is indicated by block 1834. The paraphrased logical forms, after undergoing suppression, are then provided to the filter 102 where the documents are filtered based upon the logical forms remaining after suppression. This is indicated by block 1836.

Generation of Modified Logical Forms

Figure 19:
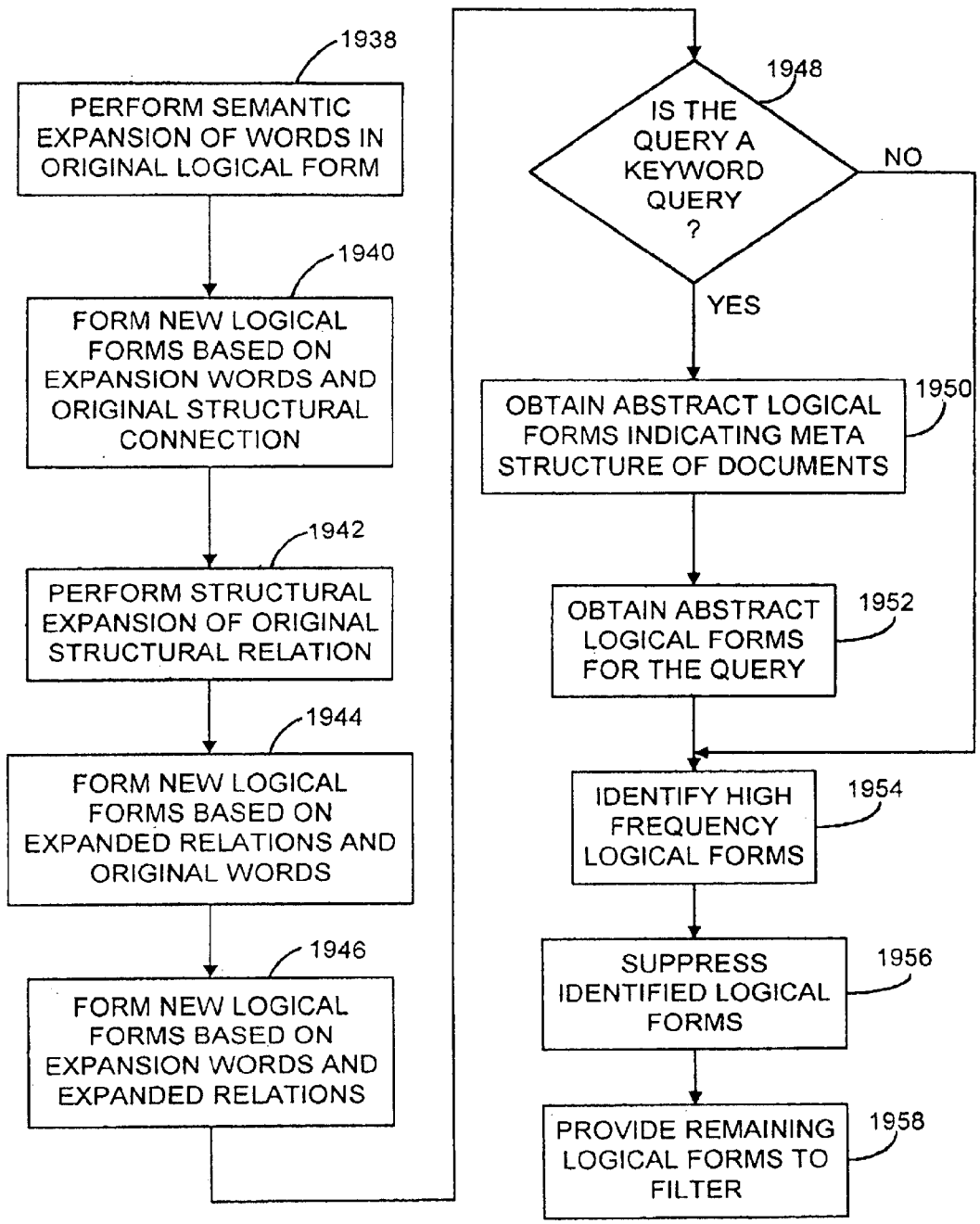
FIG. 19 is a more detailed block diagram illustrating natural language processor modification of logical forms in accordance with one aspect of the present invention.

FIG. 19 is a flow diagram better illustrating the generation of paraphrased logical forms, and the suppression of logical forms.

Semantic or Lexical Paraphrases

The original logical form is received by one of the logical form modifiers. The logical form modifier then forms lexically paraphrased logical forms by first performing semantic expansion of words in the original logical form. This is indicated by block 1938. The lexically paraphrased logical forms are then generated based on the semantically expanded words, and using the original structural connection in the original logical form. This is indicated by block 1940.

In one illustrative embodiment, the semantic expansion is performed by examining each content word in the original logical form, and expanding the word to include synonyms, hypernyms, hyponyms, or other words having a semantic relation to the original content word. For instance, logical form modifiers 94 and 98 may, in one embodiment, be provided with access to a reference corpus, such as a thesaurus, a dictionary, or a computational lexicon, such as the WordNet or MindNet lexicons, in order to identify synonyms, hypernyms, hyponyms, or other semantic relationships between words to identify possible lexical paraphrase relationships between the query and document.

Thus, for example, where the input query is:

How do spiders eat their victims?

The original logical form triples generated based on the query are:

eat; Dsub; spider eat; Dobj; victim

A lexical or semantic expansion of the word "eat" yields "consume". Also, a lexical or semantic expansion of the word "spider" yields "arachnid" and "wolf spider". These expansions, in turn, lead to the additional paraphrased logical forms for eat; Dsub; spider as follows:

consume; Dsub; spider
eat; Dsub; arachnid
consume; Dsub; arachnid
eat; Dsub; wolf_spider
consume; Dsub; wolf_spider Similarly, the lexical or semantic expansion of "victim" yields "prey". Thus, paraphrased logical forms based on the logical form eat; Dobj; victim are:

consume; Dobj; victim eat; Dobj; prey

This technique tends to retain relevant documents that are returned based on the query. Thus, this technique increases recall within this set of documents, without reducing precision.

Structural Paraphrases

After the original logical forms have been lexically expanded, they are structurally expanded to obtain additional paraphrased logical forms. Relevant documents returned by the search engine may, using more stringent techniques described in the references incorporated above by reference, be discarded even when the content words in the query occur in a single sentence in the document. This typically occurs when a syntactic or semantic paraphrase relationship exists between the query and the document sentence, but the logical forms based on the query and those based on the document do not match precisely.

In order to correctly retain documents which meet these criteria, structural paraphrase rules are implemented in the logical form modifiers to generate additional logical forms based on the original logical forms. The additional logical forms are intended to capture regular syntactic/semantic paraphrase relationships, normalizing differences between how the query was expressed by the user and how a relevant document expresses a similar concept. In order to do this, the logical form modifiers augment the basic logical forms generated based upon the original input text.

For example, if an original query is:

How many moons does Jupiter have?

The original logical form triples based on the query are:

have; Dsub; Jupiter
have; Dobj; moon
moon; Ops; many

Where Ops is an operator relation.

By implementing the structural paraphrase rules in accordance with one aspect of the present invention, the logical form modifier generates an additional logical form:

moon; PossBy; Jupiter.

It can be seen that the content words are the same as in the original logical forms, but the structural connection is a different, but related, structural connection. This allows a match against an indexed document containing the same logical form.

Other examples of structural paraphrase rules can be more complex. For instance, if the input query is: Find me information on the crystallization of viruses. This yields a computed logical form triple as follows:

crystallization; of; virus

Matching the query against a relevant document which contains a sentence describing how "viruses crystallize" can require several pieces of information to be considered. Such information can include:

1. A regular paraphrase relationship exists between Dsub/verb and certain kinds of nominalizations in English;
2. The noun "crystallization" is identified in a predefined dictionary as having a verb base "crystallize"; and
3. "Virus" is classified in the dictionary as animate.

Together, these pieces of information allow an additional structural paraphrased logical form to be hypothesized for the query, and produced for matching:

crystallize; Dsub; virus

The animacy of "virus" is used to predict whether this paraphrase should be expressed as a subject or object relation. Cross-linguistically, animate things are more likely to be the subject (agents) of verbs than are inanimate things. Thus, if the query had asked about the "crystallization of sugar" the additional paraphrased logical form:

crystallize; Dobj; sugar would have been produced.

Various logical form paraphrase rules have been implemented to normalize a number of syntactic paraphrase relationships, including:

1. Possessive construction;
2. Nominalizations/verb objects and subjects, noun compounds/verb objects (such as "program computers" and "computer program").
3. Noun modifiers (such as "the King of Spain" and "Spanish King").
4. Reciprocal constructions (such as "John kissed Mary" and "Mary kissed John");
5. Attributive/predicate adjectives (such as "That woman is tall" and "That tall woman"); and
6. Light verb constructions/verbs (such as "The President made a decision" and "The President decided").

Appendix A includes code which illustrates exemplary implementations of the rules described above. In each case, these rules allow for the retention of more relevant documents while still tightly constraining the matching process. Performing the structural expansion or structural paraphrasing of the original structural relation is indicated by block 1942 in FIG. 19. The paraphrase rules discussed above, and other such rules, can be obtained empirically, or by any other suitable means.

While structural paraphrasing can be implemented both on the indexing side of the information retrieval system, and on the query side, if it is implemented on the indexing side, it can undesirably increase the size of the index. Thus, in one illustrative embodiment, the structural paraphrasing is implemented only on the query side of the information retrieval system.

It should also be noted that the structural paraphrase can either be performed prior to the semantic paraphrasing indicated by blocks 138 and 140, or afterward. In addition, the structural paraphrase can be performed based on the additional logical forms generated during semantic expansion. This is indicated by blocks 1944 and 1946.

Meta Structure Paraphrases

An additional set of paraphrased logical forms which can be generated by the logical form modifier includes the generation of abstract logical forms. For instance, even when users are encouraged to enter natural language queries into a search engine, many users still do not provide a well-formed query with multiple content words in an interesting syntactic/semantic relationship. Rather, many queries fall into a category referred to herein as a "keyword query". Such keyword queries include true keyword queries such as "dog", "gardening", "the Renaissance", "Buffalo Bill". Keyword queries can also be in the form of keywords in a stereotypical "frame" sentence that provides no useful linguistic context, such as "Tell me about dogs", "I want information on gardening", and "What do you have on dinosaurs?" Since such queries are common, the present invention includes matching techniques to accommodate these queries.

First, the query is identified as a keyword query, as indicated by block 1948 in FIG. 19, based on its structure. A query is identified as a keyword query either if it consists of only one content word (or a sequence of content words treated as a complex content word, also known as a multi-word expression) or because it includes one or more content words occurring in an explicitly-identified, common query structure. An example of a multi-word expression is "Buffalo Bill". This is treated as a single word with internal structure.

The following rule provides one example which describes the structure used to identify keyword queries of the form "Who was Buffalo Bill?"
Treat the Dsub as a keyword for matching purposes if:
  The verb is "be"
  The Dnom (deep nominative) is "who"; or
  If the Dsub is syntactically unmodified, with the exception of a preceding determiner or prepositional phrase.

Once the query has been identified as a keyword query, a variety of abstract logical forms is generated for matching purposes. In the above example, in which the query is "Who was Buffalo Bill?", the following abstract logical forms are generated.
  heading_OR_title; Dsub; Buffalo_Bill
  Dsub_of_be; Dsub; Buffalo_Bill;
  Dsub_of_verb; Dsub; Buffalo_Bill These abstract logical forms do not correspond directly to anything contained in the original logical form generated based on the query. However, they potentially match against corresponding logical forms created in the document records when the documents are indexed and stored in statistical data store 1486. For example, in processing a document whose title is "Buffalo Bill", logical form modifier 1594 shown in FIG. 15 generates the following abstract logical form and adds it to the index in statistical data store 1596;
  heading_or_title; Dsub; Buffalo_Bill Also, during document indexing, any logical form containing the verb "be" and a Dsub yields a special logical form as follows:
  Dsub_of_be; Dsub; WORD
(e.g., Dsub_of_be; Dsub; Buffalo_Bill)

In addition, if the logical form contains a Dsub and a verb other than "be", an additional abstract logical form is created as follows:
  Dsub_of_verb; Dsub; WORD
(e.g., Dsub_of_verb; Dsub: Buffalo_Bill)

Thus, the abstract logical forms created at indexing time and at query time for keyword queries allow the information retrieval system to exploit linguistic structure on the data side in order to identify documents that are likely to be primarily about the keyword contained in the keyword query (e.g., the abstract logical forms on the data side represent the meta structure of the document which can be matched to a keyword query).

In addition, even if the document does not have a title which contains the keyword, sentences in the document can be analyzed to determine the meta structure of the document. For example, the subjects of sentences, particularly subjects of sentences whose main verb is "be", tend to be the theme or topic of that sentence. Precision can be increased, even for keyword queries, by preferentially matching the keyword queries against documents containing sentences about that keyword. For instance, where the query is "Buffalo Bill" and a first document contains the sentence:
Buffalo Bill was a showman, usually acting as the part of himself in one of Buntline's melodramas.
And a second document contains the sentence:
One of the most active performers in American cinema, Keitel demonstrated his versatile talents in the 1970's in drama, Alice Doesn't Live Here Anymore (1974); an artful western Buffalo Bill and the Indians, or Sitting Bulls history lesson (1976); and a black comedy, Mother, Jugs, and Speed (1976).

The abstract logical forms generated at indexing time for the document and at query time for the keyword query allow the keyword query to be preferentially matched against the first document as opposed to the second document. This is because the first document contains the keyword query as the subject of a sentence, while the second document does not.

An additional example of an abstract logical form is created based on definitional sentences. One example of a definitional sentence is as follows:
  Lava, molten rock which flows from volcanoes.

Definitional sentences of this type can be identified by examining cues that include linguistic structure and formatting structure. Most frequently, such sentences parse as a noun phrase containing a single noun or multi-word expression, followed by a comma, followed by a noun phrase in apposition thereto. This generates an abstract logical form of the form:
  article_title_or_heading; Dsub; lava This is indicative of the meta structure (or overall content) of the document and can be used to match against keyword queries requesting such documents.

Obtaining the abstract logical forms which are indicative of the meta structure of the documents, and obtaining abstract logical forms for the keyword query are indicated by blocks 1950 and 1952 in FIG. 19.

Suppression of Certain Logical Forms

Logical form modifiers 1594 and 1698, in accordance with another aspect of the present invention, also suppress a certain class of logical forms. For instance, certain logical forms are not good discriminators of relevant documents, and produce false positive matches. Typically, such logical forms correspond to high frequency logical forms such as "be; Locn; there". This class of logical forms can be thought of as a syntactic/semantic analog of a "stopword" found in Boolean retrieval systems. Additional examples of this class of logical form are as follows:
  Some verb/particles: come; Ptcl; to (I came to a decision, John came to a stop.)
  High frequency verbs: be; Dsub: John (John is tired, John is the largest elephant in the world)
  Pronouns: eat; Dsub; he (he ate at home)
  Common logical forms: tell; Dobj; me (tell me about dogs)

These and other such logical forms can be identified and constructed empirically, or through other suitable means, but typically correspond to those logical forms which lead to incorrect matches. In accordance with one aspect of the present invention, this class of logical forms is identified and suppressed in either the query, or the document records, or both. This is indicated by blocks 1954 and 1956 in FIG. 19.

In addition, some such logical forms can be suppressed only during the production of logical forms based on a query. For instance, a logical form of the type "give; Dobj; information" is not suppressed during document indexing, and may be useful in matching against a query such as "what databases give information on cancer?" In that instance, the user is requesting the identity of certain specific databases, and the query is quite specific. On the other hand, a logical form of the type "give; Dobj; information" is suppressed during the processing of a query of the type "give me information on X". This query is identified as a keyword query, and the identified logical form is suppressed.

After all of the logical forms and modified logical forms are obtained based on lexical or semantic paraphrase, structural paraphrase, the generation of abstract logical forms, and suppression of logical forms, the set of modified logical forms is provided to filter 1602 for further processing. This is indicated by block 1958 in FIG. 19. Filter 1602 looks for matches between modified logical forms based on the query and those based on the documents, as discussed above.

Conclusion

Thus, it can be seen that the present invention provides a system for determining similarity between two or more textual inputs. Further, one aspect of the present invention is suitable for significantly increasing precision in an information retrieval application by identifying more relevant documents in the document set returned by the search engine than did previous techniques. Also, the present invention increases recall by reducing the number of relevant documents discarded during filtering.

One aspect of the present invention illustratively creates and compares logical forms based on two textual inputs, and creates paraphrased logical forms by lexically or semantically expanding the original words, by structurally expanding the original structural connections, and/or by creating abstract logical forms indicative of the meta structure of either or both of the textual inputs (e.g., a document or query, or both). The present invention also illustratively suppresses certain logical forms. Of course, paraphrasing and suppression need not be the same for both sets of logical forms, but could differ from one to the next.

It should also be noted that hashing techniques are currently being employed to hash the index contained in statistical data store 86 to a smaller size. Of course, any suitable hashing technique can be used. The present invention can be utilized equally well with a hashed representation of the index, or with a full representation of the index.

Although the present invention has been described with reference to preferred embodiments, workers skilled in the art will recognize that changes may be made in form and detail without departing from the spirit and scope of the invention.

```
// produce variants for possessive constructions
void paraphrase_possessive(segrec seg)
{
      segrec tempseg;
      //
      // Possessive Constructions
      // PossBy/PartOf: The car's hood/ // adds [hood;PartOf;car] to the existing triple [hood;PossBy;car]
      // PossBy/"of": Mozart's concerto is short // adds [concerto;of;Mozart] to the existing triple [concerto;PossBy;Mozart]
      // "of"/PossBy: The hood of the car // adds [hood;PossBy;car], etc to the existing triple [hood;of;car]
      // "with"/PossBy: The car with a hood// adds [hood;PossBy;car], etc to the existing triple [car;with;hood;]
      // block from applying when N1 is agentive: "leader of men", "singer of songs"
      // not dealing with "The book is John's"
      if (^N_er(Head(SynNode)) & (PossBy | PrpCnjLem(first(PrpCnjs)) in? set{of with} | (Pred in? set
{have own possess} & Dsub & Dobj) )) (
            if (PossBy) {
               if (Geo(SynNode(PossBy))) print_lf_tuples1(seg,PossBy,"LocAt"); // France's capital ->
[capital;LocAt;France]
               print_lf_tuples1(seg,PossBy,"PartOf"); // 1/98 PartOf won't match yet, since LF never
generates this relation
               print_lf_tuples1(PossBy,seg,"with");
               print_lf_tuples1(seg,PossBy,"of");
               // "John's hat" ==> "hat owned by John"
      //       tempseg=segrec{%%0;}; Pred(tempseg)="own";
      //       print_lf_tuples1(tempseg,PossBy,"Dsub");
      //       print_lf_tuples1(tempseg,seg,"Dobj");
               // "John's hat" ==> "hat belonging to John"
               tempseg=segrec{%%0;};Pred(tempseg)="belong";
               print_lf_tuples1(seg,tempseg,"Props");   // unnecessary to insert Props?
               print_lf_tuples1(tempseg,seg,"Dsub");
               print_lf_tuples1(tempseg,PossBy,"to");
               }
            // X has Y/X Part Y: Jupiter has a moon.
            // adds [Jupiter;Part;moon, Jupiter;Part;moon] to the existing triple [have;Dsub;Jupiter,
have;Dobj;moon]
            // the car's hood. The hood of the car.
            else if (Pred in? set{have own possess}) {
               if (Geo(SynNode(Dsub))) print_lf_tuples1(seg,Dsub,"LocAt"); // Texas has a capital ->
[capital;LocAt;Texas]
```

-continued

```
            print_lf_tuples1(Dobj,Dsub,"PartOf"); //
            print_lf_tuples1(Dobj,Dsub,"with");
            print_lf_tuples1(Dobj,Dsub,"of");
            //
//          if (Pred ^= "own") {
//              // "John's hat" ==> "hat owned by John"
//              tempseg=segrec{%%0;}; Pred(tempseg)="own";
//              print_lf_tuples1(tempseg,Dsub,"Dsub");
//              print_lf_tuples1(tempseg,Dobj,"Dobj");
//          }
//          //
//          // check order in which these are being printed
//          if (Pred ^= "possess") {
//              // "John's hat" ==> "hat possessed by John"
//              tempseg=segrec{%%0;}; Pred(tempseg)="possess";
//              print_lf_tuples1(tempseg,Dsub,"Dsub");
//              print_lf_tuples1(tempseg,Dobj,"Dobj");
//          }
//          // "John's hat" ==> "hat belonging to John"
            tempseg=segrec{%%0;};Pred(tempseg)="belong";
            print_lf_tuples1(Dobj,tempseg,"Props");    // unnecessary to insert Props?
            print_lf_tuples1(tempseg,Dobj,"Dsub");
            print_lf_tuples1(tempseg,Dsub,"to");
        }
        else if (PrpCnjLem(first(PrpCnjs)) =="with") { // I saw a car with a hood
            print_lf_tuples1(first(PrpCnjs),seg,"PartOf"); //
            print_lf_tuples1(first(PrpCnjs),seg,"PossBy");
            print_lf_tuples1(first(PrpCnjs),seg,"of");
        }
        else {                                         // "of" I saw the hood of the car
            if (Geo(SynNode(first(PrpCnjs)))) print_lf_tuples1(seg,first(PrpCnjs),"LocAt"); // the
capital of Texas -> [capital;LocAt;Texas]
            print_lf_tuples1(seg,first(PrpCnjs),"PartOf"); //
            print_lf_tuples1(seg,first(PrpCnjs),"PossBy");
            print_lf_tuples1(seg,first(PrpCnjs),"with");
        }
    }
    return;
}
void paraphrase_noun_modifier(segrec seg)
{
    segrec tempseg, base, base_rec;
    //
    // Adj N / N of Adj base: The Spanish king // adds [king;of;Spain] to the existing triple [king;
Nadj;Spanish]
    // The Chinese and Japanese officials were present. The Chinese and Japanese officials had brief
cases and books.
    //
    // Currently restricted to adjectives that are OnlyUpr (i.e. which appear only in upper case in
lexicon) in order to block
    // e.g. "selfish king" --> "king of self". This restriction limits rule to nationalities
[anything else?]
    // this blocks useful paraphrases like "industrial giant"/"giant of industry". Constraint too
broad currently.
    // It may be that NONE of the relevant Adj records (Spanish, Icelandic, etc.) currently have Bases,
so only the second condition may fire
    if (OnlyUpr(SynNode) & (seg in? Nadj(first(Parents)) | seg in? Crds(first(Nadj(first(Parents(first
(Parents))))))) ) {
        if (Bases(Adj(Lex(SynNode)))) {
            foreach(base;Bases(Adj(Lex(SynNode)))) {
                tempseg=segrec{%%0;};
                Pred(tempseg)=Lemma(base);
                if (Loc_sr(first(Parents))) {
                    // for modified places: Spanish city -> city LocAt Spain
                    if (Crds(first(Parents))) print_lf_tuples1(first(Parents(first(Parents))),tempseg,
"LocAt");
                    else print_lf_tuples1(first(Parents),tempseg,"LocAt");
                }
                else {
                    base_rec=lex_get(Lemma(base),0); // lex_get the base
                    if (^Noun(base_rec)) base_rec=lex_get(loweratom(Lemma(base)),0); // if initial
lex_get fails, try lower-casing the base
                    if (Geo(Noun(base_rec))) (// for modifying Geo PrprNs that don't have Loc_sr:
American city -> city LocAt America
                        // for modified places that don't have Loc_sr: American city -> city LocAt
America
                        if (Crds(first(Parents))) print_lf_tuples1(first(Parents(first(Parents))),
tempseg,"LocAt");
                        else print_lf_tuples1(first(Parents),tempseg,"LocAt");
```

```
                    }
                }
                // also allow "of" possibility: city of Spain
                if (Crds(first(Parents))) print_lf_tuples1(first(Parents(first(Parents))),tempseg,
"of");
                else print_lf_tuples1(first(Parents),tempseg,"of");
            }
        }
        // if the Adj doesn't have a Bases attribute, try the corresponding Noun record: Chinese/
China, French/France
        else if (Bases(Noun(Lex(SynNode)))) {
            foreach(base;Bases(Noun(Lex(SynNode)))) {
                tempseg=segrec{%%0;};
                Pred(tempseg)=Lemma(base);
                // What's the biggest American city? -> city in America
                if (Loc_sr(first(Parents))) {
                    if (Crds(first(Parents))) print_lf_tuples1(first(Parents(first(Parents))),tempseg,
"LocAt");
                    else print_lf_tuples1(first(Parents),tempseg,"LocAt");
                }
                else { // for modifying Geo PrprNs that don't have Loc_sr: American city -> city LocAt
America
                    base_rec=lex_get(Lemma(base),0); // lex_get the base
                    if (^Noun(base_rec)) base_rec=lex_get(loweratom(Lemma(base)),0); // if initial
lex_get fails, try lower-casing the base
                    if (Geo(Noun(base_rec))) {
                        if (Crds(first(Parents))) print_lf_tuples1(first(Parents(first(Parents))),
tempseg,"LocAt");
                        else print_lf_tuples1(first(Parents),tempseg,"LocAt");
                    }
                }
                // also allow "of" possiblity: city of America
                if (Crds(first(Parents))) print_lf_tuples1(first(Parents(first(Parents))),tempseg,
"of");
                else print_lf_tuples1(first(Parents),tempseg,"of");
            }
        }
    }
    // default case for Nadj-->Dadj (opposite direction is in paraphrase_dadj): the tall king -->
the king is tall [king;Dadj;tall]
    else if (seg in? Nadj(first(Parents))) print_lf_tuples1(first(Parents),seg,"Dadj");
    //
    // N1 + [for N2] --> [N2;Mods;N1]: "recipe for pizza" -> "pizza recipe", "box for toys" -->
"toy box"
    // if N2 is PrprN (maybe [+Humn]????) don't rewrite (assumed to be benefactive, though possession
might be acceptable rewrite)
    // "recipe for John" -> "John's recipe"
    if (PrpCnjLem(first(PrpCnjs))=="for" & Nodetype(Head(SynNode))=="NOUN" & Nodetype(Head(SynNode
(first(PrpCnjs))))=="NOUN" &
        ^PrprN(first(PrpCnjs)) & ^Prmods(Head(SynNode(first(PrpCnjs)))) & ^Psmods(Head(SynNode(first
(PrpCnjs)))) ) {
        print_lf_tuples1(seg,first(PrpCnjs),"Mods");
    }
    // Mod/Dobj:space exploration/explore space,oil production/produce oil;"farm mechanization is
inevitable"->[mechanize;Dobj/farm]
    // Need to deal with multiple modifiers, like "oil producing country"
    if (Mods & Bases(SynNode)) { // redundant constraint; Nodetype(Head(SynNode))=="NOUN"
        foreach(base;Bases(SynNode)) {
            tempseg=segrec{%%0;};
            Pred(tempseg)=Lemma(base);
            print_lf_tuples1(tempseg,first(Mods),"Dobj");
        }
    }
    return;
}
// Crystalization of viruses. The encroachment of civilization. The action of the committee.
// Animacy/Instr check constrains what can be paraphrased as a Dsub vs. Dobj:
//                [crystalize;Dsub;virus] but [announce;Dobj;results]
// This isn't adequate, since lots of other things can act as agents (drugs, civilization, etc.)
void paraphrase_nominalization(segrec seg)
{
    segrec tempseg, base;
    //
    if ((Dobj | PrpCnjLem(first(PrpCnjs))=="of") & Nodetype(Head(SynNode))=="NOUN" {
        // adds [crystallization;Mods;virus], [announcement;Mods;results]
        if (Dobj) print_lf_tuples1(seg,Dobj,"Mods");
        else print_lf_tuples1(seg,first(PrpCnjs),"Mods");
        // adds [crystalize;Dobj;virus]
        if (Bases(SynNode)) {
```

-continued

```
            foreach(base;sublist(Bases(SynNode),[Cat=="Verb]")) {
                if (Lemma(base)==Pred) continue; // the programming of computers is fun: Pred is
already "program"
                tempseg=segrec{%%0;};
                Pred(tempseg)=Lemma(base);
                if (Dobj) {
                    if (Anim(Dobj) | Instr(Dobj)) print_lf_tuples1(tempseg,Dobj,"Dsub"); //people,
machines, animals: [act;Dsub;committee]
                    else print_lf_tuples1(tempseg,Dobj,"Dobj");         //
                }
                else {
                    if (Anim(first(PrpCnjs)) | Instr(first(PrpCnjs))) print_lf_tuples1(tempseg,first
(PrpCnjs),"Dsub"); // people, machines, animals
                    else print_lf_tuples1(tempseg,first(PrpCnjs),"Dobj"); //"civilization" not marked
"Anim", so ends up a Dobj
                }
            }
        }
    }
    return;
}
// are these mutually exclusive, or should all be allowed to fire?
void paraphrase_noun_compound(segrec seg)
{
    // Noun compound expanded as verb-object.
    // Tighter constraints may be necessary to block e.g. grocery store --> store Dobj grocery but
not e.g. weapons store/store weapon
    // computer program --> program computer
    if (Mods & Nodetype(Head(SynNode))=="NOUN" & Verb(Lex(SynNode))) {
        print_lf_tuples1(seg,first(Mods),"Dobj");
    }
    //
    // Noun compound expanded as possessive N1 [+Geo, +PrprN] N2 -> N2 LocAt N1
    // Texas capital --> program computer
    if (Mods & Geo(Head(SynNode(first(Mods)))) & PrprN(Head(SynNode(first(Mods))))) {
        print_lf_tuples1(seg,first(Mods),"LocAt");
    }
    // Noun compound N1 Mods N2 as "N2 of N1" slang dictionary --> dictionary of slang
    if (Mods & Nodetype(Head(SynNode))=="NOUN") {
        print_lf_tuples1(seg,first(Mods),"of");
    }
    return;
}
void paraphrase_verb_object(segrec seg)
{
    segrec lex_record;
    // Dobj/Mod: program computer vs. computer program
    // N/V Prob constraint blocks paraphrases like: "I eat food" adds *"food;Mods;eat"
    // To do right, need derivation links, so that e.g. "explore cave"-->"exploration;Mods;cave", not
current "explore;Mods;cave"
    // 1/98
    // also need to produce derived nominalizations of verb/object pairs: produce oil --> oil production.
Can't do that currently
    // because the .gxc doesn't contain this info. Josephp will produce a special-purpose .gxc containing
these links
    if (Dobj) {
        // if Probs for both N and V are available for comparison: I program computers. I code
programs.I
        if (Prob(Verb(Lex(SynNode))) > 0 & Prob(Noun(Lex(SynNode)))>(Prob(Verb(Lex(SynNode)))))
print_lf_tuples1(Dobj,seg,"Mods");
        // if verbal morphology has ruled out other POS interps, need to go back and lex_get to see
relative Probs of uninflected form
        // I milked the cow. I snared an animal. I loaded the truck.
        else {
            lex_record=lex_get(Pred,0);
            //disp_rec(Noun(lex_record),1,0);disp_newlines(1);
            //disp_rec(Verb(lex_record),1,0);disp_newlines(1);
            if (Prob(Verb(lex_record)) > 0 & Prob(Noun(lex_record))>(Prob(Verb(lex_record)))) {
                //display("Noun Prob greater than Verb for: ");disp_atom(Pred);disp_newlines(1);
                print_lf_tuples1(seg,Dobj,"Mods");
            }
        }
    }
    //
    // Locative Ptcl+Dobj --> Locn relation between verb and Dobj
    // Who walked on the moon [walk;Dobj;moon] --> [walk;Locn;moon]
    // floated on the river [float;on;river] --> [float;Locn;river]
    if ((Dobj & (Pred(Ptcl) in? set{in on into})) | PrpCnjLem(first(PrpCnjs)) in? set{in on along
beside near} ) {
```

-continued

```
        if (Dobj) print_lf_tuples1(seg,Dobj,"Locn");
        else print_lf_tuples1(seg,first(PrpCnjs),"Locn");
        }
    //
        return;
    }
void paraphrase_reciprocal(segrec seg)
{
    //
    // John kissed Mary / Mary kissed John
    if (Marry & Dsub & Dobj) {
        print_lf_tuples1(seg,Dobj,"Dsub");
        print_lf_tuples1(seg,Dsub,"Dobj");
    }
    //
//      // X compared to Y/Y compared to X: the sun compared to the moon; X contrasted with Y/Y
contrasted with X:
//      // adds [Jupiter;Part;moon, Jupiter;Part;moon] to the existing triple [have;Dsub;Jupiter,
have;Dobj;moon]
//      if (Recip & (Dsub & Lemma(Dsub) ^="x" | Dobj & Lemma(Dsub)=="x") & PrpCnjs) {
//          if (Dsub & Lemma(Dsub) ^="x") print_lf_tuples1(Dsub,Dobj,"compared_to");
//          else print_lf_tuples1(Dsub,Dobj,"compared_to");
//      }
    return;
    }
```

What is claimed is:

1. A method of determining similar ity between first and second textual inputs, the method comprising:
 obtaining a first set of logical forms based on the first textual input;
 obtaining a second set of logical forms based on the second textual input;
 comparing the first and second sets of logical forms; and
 determining similarity between the first and second textual inputs based on the step of comparing.

2. The method of claim 1 wherein comparing comprises:
 determining whether any logical forms in the first set match any logical forms in the second set.

3. The method of claim 2 wherein determining similarity comprises:
 assigning a score to reflect a degree of similarity between the first and second textual inputs based on matches between the first and second sets of logical forms.

4. The method of claim 1 and further comprising: obtaining a first set of paraphrased logical forms based on the first set of logical forms.

5. The method of claim 4 wherein the comparing step comprises:
 comparing the first set of paraphrased logical forms with the second set of logical forms; and
 determining whether any paraphrased logical forms in the first set of paraphrased logical forms matches any logical forms in the second set of logical forms.

6. The method of claim 5 and further comprising:
 obtaining a second set of paraphrased logical forms based on the second set of logical forms.

7. The method of claim 6 wherein the comparing step further comprises:
 comparing the first set of paraphrased logical forms with the second set of paraphrased logical forms; and
 determining whether any paraphrased logical forms in the first set of paraphrased logical forms matches any paraphrased logical forms in the second set of paraphrased logical forms.

8. The method of claim 1 wherein the first textual input comprises an information retrieval query and wherein the second textual input comprises at least one document retrieved based on the query.

9. The method of claim 1 wherein the second textual input comprises an information retrieval query and wherein the first textual input comprises at least one document retrieved based on the query.

10. The method of claim 5, wherein the original structural relation comprises an original structural relation between the original words, and wherein obtaining a first set of paraphrased logical forms comprises:
 obtaining additional logical forms including expansion words, semantically related to the original words, and connected by the original structural relation.

11. The method of claim 9 wherein the original words include a first original word and a second original word connected by the original structural relation and wherein obtaining additional logical forms comprises at least one of:
 lexically expanding the first original word to include first related words which are semantically related to the first original word;
 lexically expanding the second original word to include second related words which are semantically related to the second original word; and
 connecting different ones of the first and second related words to one another by the original structural relation to obtain the additional logical forms.

12. The method of claim 11 wherein lexically expanding the first original word or lexically expanding the second original word comprises:
 obtaining synonyms for the first and second original words.

13. The method of claim 11 wherein lexically expanding the first original word or lexically expanding the second original word comprises:
 obtaining hypernyms for the first and second original words.

14. The method of claim 11 wherein lexically expanding the first original word or lexically expanding the second original word comprises:
 obtaining hyponyms for the first and second original words.

15. The method of claim 12 wherein obtaining a first set of paraphrased logical forms comprises:
  obtaining expanded structural relations related to the original structural relation; and
  connecting the original words with the expanded structural relations to obtain the paraphrased logical forms.

16. The method of claim 15 wherein obtaining a first set of logical forms further comprises:
  obtaining expansion words, semantically related to the original words; and
  connecting the expansion words with the original structural relation.

17. The method of claim 16 wherein obtaining a first set of paraphrased logical forms further comprises:
  connecting the expansion words with the expanded structural relations.

18. The method of claim 17 wherein the first set of logical forms includes at least one content word and wherein obtaining a first set of paraphrased logical forms comprises:
  obtaining a first set of abstract logical forms based on the content word.

19. The method of claim 18 wherein the first textual input comprises a document retrieval query and wherein obtaining a first set of abstract logical forms comprises:
  prior to generating the first set of abstract logical forms, identifying the query as a keyword query, in which the content word is unmodified by another content word, based on a structure of the query.

20. The method of claim 19 wherein the second textual input comprises a document, and further comprising:
  obtaining a second set of paraphrased logical forms based on the second set of logical forms.

21. The method of claim 20 wherein obtaining the second set of logical forms comprises:
  obtaining a set of abstract logical forms indicative of a meta structure of the document.

22. The method of claim 21 wherein the meta structure of the document is indicative of a general subject matter of the document.

23. The method of claim 21, wherein obtaining the set of abstract logical forms indicative of a meta structure of the document comprises:
  obtaining the set of abstract logical forms based on formatting information corresponding to the document.

24. The method of claim 22 wherein obtaining the set of abstract logical forms indicative of a meta structure of the document comprises:
  obtaining the set of abstract logical forms based on topics of sentences in the document.

25. The method of claim 22 wherein obtaining the set of abstract logical forms indicative of a meta structure of the document comprises:
  obtaining the set of abstract logical forms based on subjects of sentences in the document.

26. The method of claim 20 and further comprising:
  suppressing other logical forms based on the content word, other than the first and second set of paraphrased logical forms.

27. A method of filtering documents in a document set retrieved from a document store in response to a query, the method comprising:
  obtaining a first set of logical forms based on a selected one of the query and the documents in the document set;
  obtaining a second set of logical forms based on another of the query and the documents in the document set;
  obtaining a first set of paraphrased logical forms indicative of paraphrases of at least the first set of logical forms; and
  filtering documents in the document set based on a predetermined relationship between the first set of paraphrased logical forms and the second set of logical forms.

28. The method of claim 27 wherein obtaining the first set of logical forms comprises:
  obtaining original words and an original structural relation between the original words based on the selected one of the query and the documents in the document set.

29. The method of claim 28 wherein the original structural relation comprises an original structural relation between the original words, and wherein obtaining a first set of paraphrased logical forms comprises:
  obtaining additional logical forms including expansion words, semantically related to the original words, and connected by the original structural relation.

30. The method of claim 29 wherein the original words include a first original word and a second original word connected by the original structural relation and wherein obtaining additional logical forms comprises at least one of:
  lexically expanding the first original word to include first related words which are semantically related to the first original word;
  lexically expanding the second original word to include second related words which are semantically related to the second original word; and
  connecting different ones of the first and second related words to one another by the original structural relation to obtain the additional logical forms.

31. The method of claim 30 wherein lexically expanding the first original word and lexically expanding the second original word comprises:
  obtaining synonyms for the first or second original words.

32. The method of claim 30 wherein lexically expanding the first original word and lexically expanding the second original word comprises:
  obtaining hypernyms for the first or second original words.

33. The method of claim 30 wherein lexically expanding the first original word and lexically expanding the second original word comprises:
  obtaining hyponyms for the first or second original words.

34. The method of claim 28 wherein obtaining a first set of paraphrased logical forms comprises:
  obtaining expanded structural relations syntactically related to the original structural relation; and
  connecting the original words with the expanded structural relations to obtain the paraphrased logical forms.

35. The method of claim 34 wherein obtaining a first set of logical forms further comprises:
  obtaining expansion words, semantically related to the original words; and
  connecting the expansion words with the original structural relation.

36. The method of claim 35 wherein obtaining a first set of paraphrased logical forms further comprises:
  connecting the expansion words with the expanded structural relations.

37. The method of claim 27 wherein the first set of logical forms includes at least one content word and wherein obtaining a first set of paraphrased logical forms comprises:

obtaining a first set of abstract logical forms based on the content word.

38. The method of claim 37 wherein the selected one of the query and the documents in the document set comprises the query and wherein obtaining a first set of abstract logical forms comprises:

prior to generating the first set of abstract logical forms, identifying the query as a keyword query, in which the content word is unmodified by another content word, based on a structure of the query.

39. The method of claim 38 wherein the second set of logical forms is based on the documents in the document set, and further comprising:

obtaining a second set of paraphrased logical forms based on the second set of logical forms.

40. The method of claim 39 wherein obtaining the second set of logical forms comprises:

obtaining a set of abstract logical forms indicative of a meta structure of each of the documents in the document set.

41. The method of claim 40 wherein the meta structure of each document is indicative of a general subject matter of the document.

42. The method of claim 41 wherein obtaining the set of abstract logical forms indicative of a meta structure of each of the documents comprises:

obtaining the set of abstract logical forms based on formatting information corresponding to each document.

43. The method of claim 41 wherein obtaining the set of abstract logical forms indicative of a meta structure of each of the documents comprises:

obtaining the set of abstract logical forms based on topics of sentences in each document.

44. The method of claim 41 wherein obtaining the set of abstract logical forms indicative of a meta structure of each of the documents comprises:

obtaining the set of abstract logical forms based on subjects of sentences in each document.

45. The method of claim 39 and further comprising:

suppressing other logical forms based on the content word, other than the first and second set of paraphrased logical forms.

46. The method of claim 27, wherein filtering comprises:

providing an output indicative of a ranked order of the documents in the document set based on the predetermined relationship.

47. A method of filtering documents in a document set retrieved from a document store in response to a query, the method comprising:

obtaining a first set of logical forms based on a selected one of the query and the document set;

obtaining a second set of logical forms based on based on another of the query and the document set;

suppressing a first predetermined class of logical forms in at least the first set of logical forms to obtain a first suppressed set of logical forms; and filtering the documents in the document set based on a predetermined relationship between the first suppressed set of logical forms and the second set of logical forms.

48. The method of claim 47 wherein suppressing comprises:

suppressing logical forms having a predetermined structure.

49. The method of claim 47 wherein suppressing comprises:

suppressing logical forms occurring with a frequency which exceeds a threshold frequency level.

50. The method of claim 47 and further comprising:

suppressing a second predetermined class of logical forms in the second set of logical forms, the second predetermined class being different from the first predetermined class.

51. The method of claim 47 wherein suppressing is performed prior to obtaining the first set of logical forms.

52. The method of claim 47 wherein suppressing is performed substantially simultaneously with obtaining the first set of logical forms.

53. The method of claim 47 wherein suppressing is performed after obtaining the first set of logical forms.

54. A computer readable medium including computer readable data stored thereon, the computer readable data including:

index data indicative of contents of documents in a document set; and a set of abstract logical forms indicative of a meta structure of each of the documents in the document set, the abstract logical forms representing information not found in an explicit expression in corresponding documents.

55. The computer readable medium of claim 54 wherein the meta structure of each document is indicative of a general subject matter of the document.

56. The computer readable medium of claim 55 wherein the set of abstract logical forms are based on formatting information corresponding to each document.

57. The computer readable medium of claim 55 wherein the abstract logical forms are based on topics of sentences in each document.

58. The computer readable medium of claim 55 wherein the set of abstract logical forms are based on subjects of sentences in each document.

59. A computer readable medium including computer readable instructions stored thereon which, when executed by the computer, cause the computer to filter documents in a document set from a document store in response to a query by performing the steps of:

obtaining a first set of logical forms based on a selected one of the query and the documents in the document set;

obtaining a second set of logical forms based on another of the query and the documents in the document set;

using natural language processing to modify at least the first set of logical forms to obtain a first modified set of logical forms; and filtering documents in the document set based on a predetermined relationship between the first modified set of logical forms and the second set of logical forms.

60. The computer readable medium of claim 59 wherein using natural language processing comprises:

obtaining a first set of paraphrased logical forms indicative of paraphrases of at least the first set of logical forms.

61. The computer readable medium of claim 60 wherein obtaining the first set of logical forms comprises:

obtaining original words and an original structural relation between the original words based on the selected one of the query and the documents in the document set.

62. The computer readable medium of claim 61 wherein the original structural relation comprises an original structural relation between the original words, and wherein obtaining a first set of paraphrased logical forms comprises:

obtaining additional logical forms including expansion words, semantically related to the original words, and connected by the original structural relation.

63. The computer readable medium of claim 61 wherein obtaining a first set of paraphrased logical forms comprises:

obtaining expanded structural relations syntactically related to the original structural relation; and connecting the original words with the expanded structural relations to obtain the paraphrased logical forms.

64. The computer readable medium of claim 59 wherein the first set of logical forms includes at least one content word and wherein obtaining a first set of paraphrased logical forms comprises:

obtaining a first set of abstract logical forms based on the content word.

65. The computer readable medium of claim 64 wherein the selected one of the query and the documents in the document set comprises the query and wherein obtaining a first set of abstract logical forms comprises:

prior to generating the first set of abstract logical forms, identifying the query as a keyword query, in which the content word is unmodified by another content word, based on a structure of the query.

66. The computer readable medium of claim 59 wherein the first set of logical forms is based on the documents in the document set, and wherein using natural language processing comprises:

obtaining a set of abstract logical forms indicative of a meta structure of each of the documents in the document set.

67. The computer readable medium of claim 59 wherein using natural language processing comprises:

suppressing a first predetermined class of logical forms in at least the first set of logical forms to obtain a first suppressed set of logical forms.

68. The computer readable medium of claim 67 wherein suppressing comprises:

suppressing logical forms having a predetermined structure.

69. The computer readable medium of claim 67 wherein suppressing comprises:

suppressing logical forms occurring with a frequency which exceeds a threshold frequency level.

70. A method of determining similarity between first and second textual inputs, the method comprising:

obtaining a first set of logical forms based on the first textual input;

obtaining a second set of logical forms based on the second textual input;

suppressing a first predetermined class of logical forms in at least the first set of logical forms to obtain a first suppressed set of logical forms; and determining similarity between the first and second textual inputs by comparing the first suppressed set of logical forms and the second set of logical forms.

71. The method of claim 70 wherein suppressing comprises:

suppressing logical forms having a predetermined structure.

72. The method of claim 70 wherein suppressing comprises:

suppressing logical forms occurring with a frequency which exceeds a threshold frequency level.

73. The method of claim 70 and further comprising:

suppressing a second predetermined class of logical forms in the second set of logical forms, the second predetermined class being different from the first predetermined class.

74. The method of claim 70 wherein suppressing is performed prior to obtaining the first set of logical forms.

75. The method of claim 70 wherein suppressing is performed substantially simultaneously with obtaining the first set of logical forms.

76. The method of claim 70 wherein suppressing is performed after obtaining the first set of logical forms.

* * * * *